United States Patent
Nonaka

(10) Patent No.: US 6,430,370 B1
(45) Date of Patent: Aug. 6, 2002

(54) DISTANCE-MEASURING APPARATUS AND METHOD FOR CAMERA

(75) Inventor: Osamu Nonaka, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/660,089

(22) Filed: Sep. 12, 2000

(30) Foreign Application Priority Data

Sep. 17, 1999 (JP) ............................................ 11-263787

(51) Int. Cl.$^7$ .............................. G03B 13/18; G01B 9/00
(52) U.S. Cl. ........................... 396/89; 396/92; 396/111; 396/121; 250/201.8
(58) Field of Search .............................. 396/89, 92, 96, 396/98, 102, 106, 109, 121, 111, 103, 100; 250/201.8

(56) References Cited

U.S. PATENT DOCUMENTS

| | | | | |
|---|---|---|---|---|
| 5,051,767 A | * | 9/1991 | Honma et al. ................. 396/80 |
| 5,144,358 A | * | 9/1992 | Tsuru et al. ................... 396/50 |
| 5,241,167 A | * | 8/1993 | Suzuki et al. ............. 250/201.8 |
| 5,721,977 A | * | 2/1998 | Yamawaki et al. ........... 396/92 |

FOREIGN PATENT DOCUMENTS

JP     10-161010     6/1998

* cited by examiner

*Primary Examiner*—Russell Adams
*Assistant Examiner*—Arthur A Smith
(74) *Attorney, Agent, or Firm*—Frishauf, Holtz, Goodman & Chick, P.C.

(57) ABSTRACT

A distance-measuring apparatus for a camera comprises an area sensor, an integration circuit, and a switching circuit. The above-mentioned area sensor receives light of a picture image in the image plane. The integration circuit integrates output signals of this area sensor. The control circuit controls operations of starting and stopping the integration of the above-mentioned integration circuit, based on output signals corresponding to a specific block of the above-mentioned area sensor. The switching circuit switches the above-mentioned specific block according to using state of the camera.

30 Claims, 14 Drawing Sheets

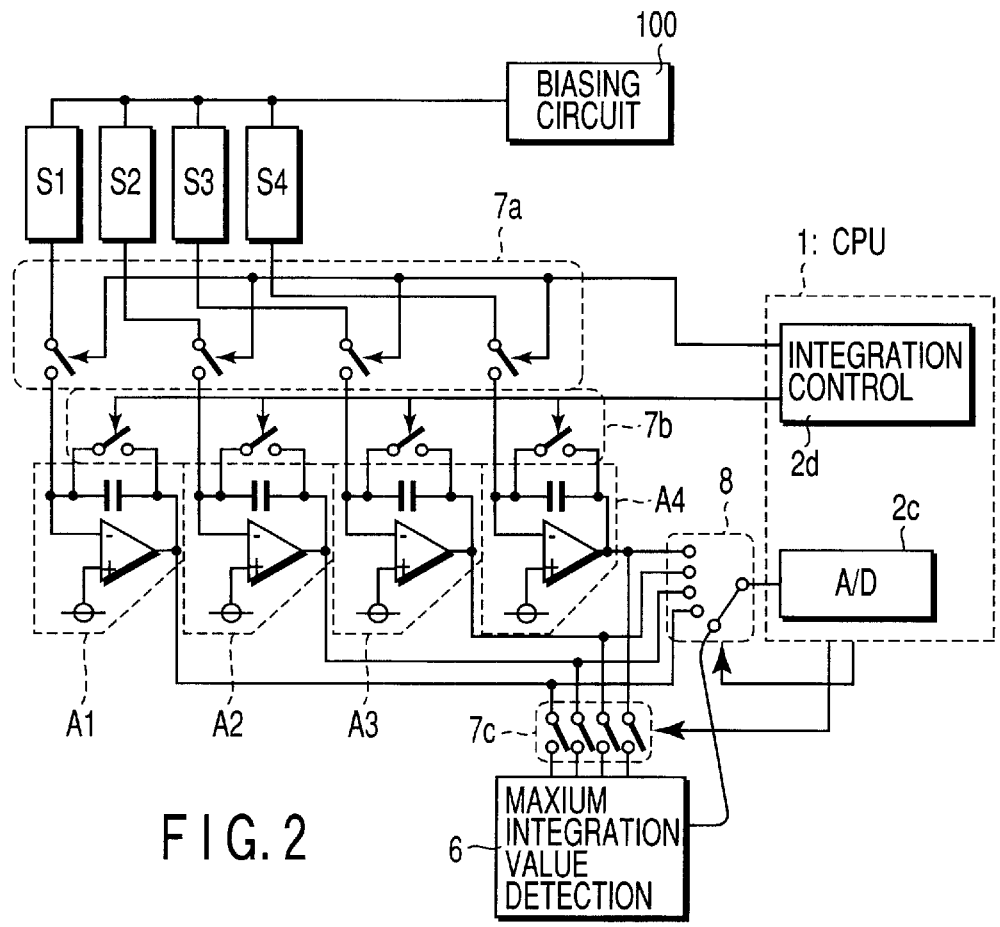
FIG. 2
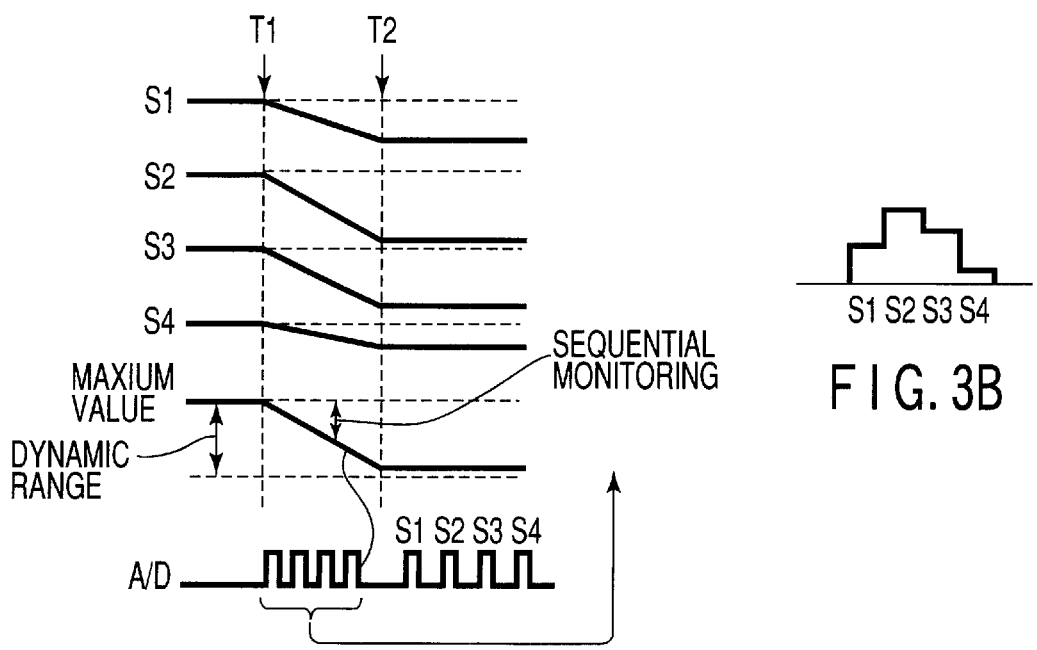
FIG. 3A
FIG. 3B

DISTANCE-MEASURABLE AREA

PATTERN D
PATTERN A
PATTERN C
PATTERN B

PATTERN A

PATTERN B

PATTERN C

PATTERN D

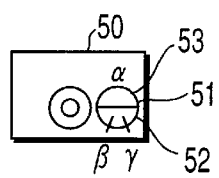 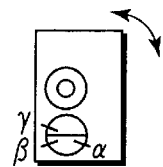 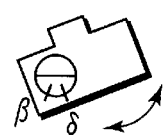
FIG. 8A    FIG. 8B    FIG. 8C
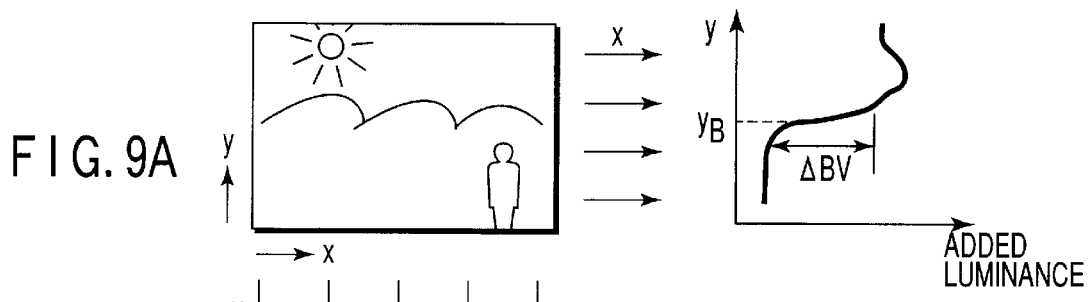
FIG. 9A
FIG. 9B
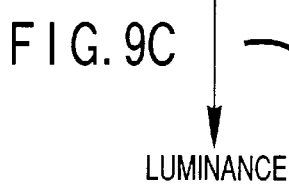
FIG. 9C
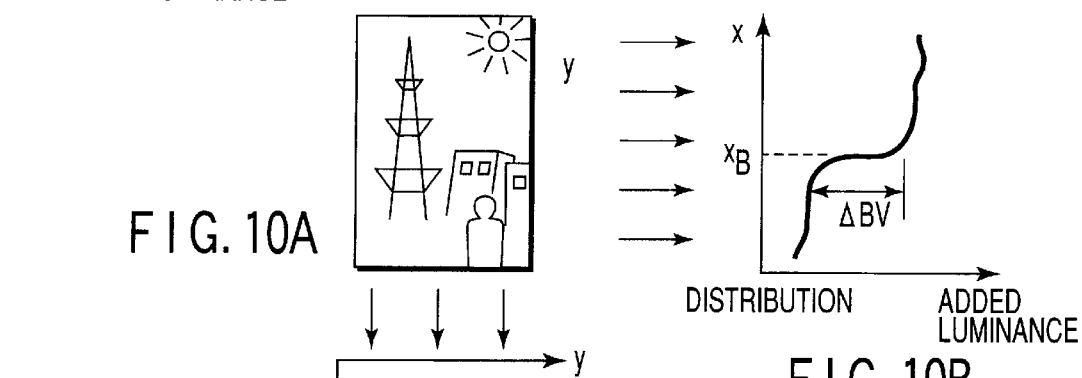
FIG. 10A
FIG. 10B
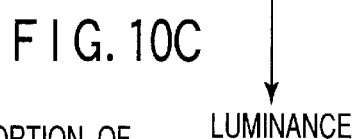
FIG. 10C
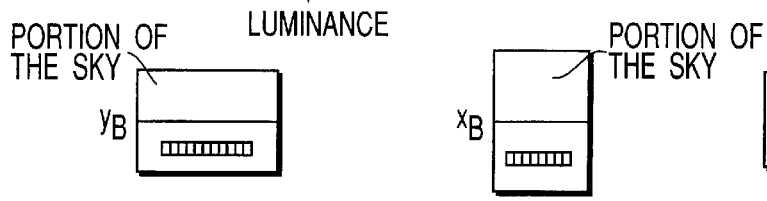 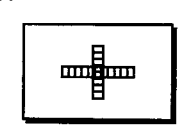
FIG. 11A    FIG. 11B    FIG. 11C

DISTANCE-MEASURING APPARATUS AND METHOD FOR CAMERA

CROSS-REFERENCE TO RELATED APPLICATIONS

This application is based upon and claims the benefit of priority from the prior Japanese Patent Application No. 11-263787, filed Sept. 17, 1999, the entire contents of which are incorporated herein by reference.

BACKGROUND OF THE INVENTION

The present invention relates to a distance-measuring apparatus and a distance-measuring method for a camera.

The distance-measuring apparatus for a camera uses either distance-measuring methods of an active type or those of a passive type. Among these, the active-type method performs the distance-measuring by projecting signal light from a camera and using its reflected signal light, whereas the passive-type method carries out focusing by using image signals in the picture image plane.

Since in the passive-type distance-measuring apparatus a dynamic measure of a distance-measuring sensor is limited, it is difficult to carry out image detection of all subjects so as to have a proper luminance level in scenes where various subjects may have a variety of luminances in the image plane. Then, to solve this problem, the U.S. Pat. No. 5,721,977 (corresponding to Japanese Published Unexamined Patent Application No. 10-161010) discloses a technology whereby pixels whose integration has been completed are selected on the basis of the photometric value, the photographing mode, and the focal length.

In addition, it is extremely difficult to select a main subject (a photographer's intended subject) among all photographing subjects and if this selection doesn't work well, there may be a case where an image of the subject to be measured becomes too dark to perform the distance-measuring and miscellaneous images having no necessity of being measured. In such cases, neither the correct distance-measuring nor correct focusing can be performed.

On the contrary, in the camera capable of focusing only a specific area in the image plane, the freedom of composition is restricted. To cope with this problem, the camera capable of measuring multiple points in the image plane has been devised. However, multiple-point distance-measuring like this needs a contrivance that considers the above-mentioned problem (selection of the proper distance-measuring point) even more extensively.

The above-mentioned U.S. Pat. No. 5,721,977 discloses the improvement to a comparatively narrow area and leaves a subject in lengthwise composition and a subject located at one of the corners of the image plane out of consideration. Thus, the conventional technology cannot carry out correct focusing that corresponds to various photographing scenes by making possible distance-measuring on several points in a wide area of the image plane.

BRIEF SUMMARY OF THE INVENTION

Therefore it is the object of the present invention to provide the distance-measuring apparatus for a camera capable of measuring several points in a wide area of the image plane and controlling image signals so as to have a proper level within the dynamic measure of image signal detecting means while giving the freedom of setting distance-measuring positions according to the subject position with an intention of making possible correct focusing that corresponds to various photographing scenes.

To achieve the above-mentioned object, a first aspect of the present invention discloses a distance-measuring apparatus for a camera comprising: an area sensor for light-receiving a picture image in the image plane; an integration circuit for integrating output signals of this area sensor; an integration control circuit for controlling an operation of starting the integration and an operation of stopping the integration of the above-mentioned integration circuit based on output signals that correspond to a specific block of the above-mentioned area sensor; and a switching circuit for switching the above-mentioned specific block according to the using state of the camera.

Moreover, a second aspect of the present invention discloses a distance-measuring apparatus for a camera comprising of: a sensor array; first integration means to measure a subject image distribution in the image plane based on outputs of this sensor array; determining means for determining a specific area in the above-mentioned sensor array for making integration judgment at the time of the distance-measuring in accordance with a measurement result of the above-mentioned subject image distribution by this first integrating means; and second integrating means for controlling the integration of the above-mentioned sensor array based on signals from the above-mentioned specific area determined by the above-mentioned determining means in order to measure the image signal at the time of the above-mentioned distance-measuring.

Furthermore, a third aspect of the present invention discloses a method for performing the distance-measuring for a camera comprising: a first integration step of integrating image signals in the above-mentioned image plane to specify a main subject in the image plane; a second integration step of integrating image signals of the above-mentioned main subject; and a calculation step of calculating the distance to the above-mentioned main subject by using a result of the above-mentioned second integration step, wherein the above-mentioned first integration step and the above-mentioned second integration step have respective sets of pixels which form different shapes and wherewith the integration judgment is made. moreover, a fourth aspect of the present invention discloses a distance-measuring apparatus for obtaining the distance to the subject comprising of: an area sensor; detecting means for detecting a subject image using outputs of this area sensor; and switching means for setting integration judgment areas which are formed by selecting and combining a plurality of pixels in the above-mentioned area sensor and controlling the above-mentioned judgment area so as to take a plurality of shapes in order to control the above-mentioned subject image to be within a proper integration measure.

Moreover, a fifth aspect of the present invention discloses a distance-measuring apparatus for a camera comprising: an area sensor that can use a plurality of areas in a two-dimensional light-receiving area as monitor areas for integration control; emission means for projecting light toward the subject; monitor selecting means for making the above-mentioned emission means operate, receiving reflected light from the above-mentioned subject with the area sensor at this moment, and selecting the above-mentioned monitor area based on outputs thereof; and controlling means for conducting the integration control of the output signals of the above-mentioned area sensor based on the outputs of the monitor area selected by the above-mentioned monitor selecting means.

Moreover, a sixth aspect of the present invention discloses a distance-measuring apparatus of a camera comprising: (a) a plurality of area sensors of a main system and a sub system; setting means for setting monitor area(s) to be used for controlling an integral time of the above-mentioned area sensor of the main system based on image information of the above-mentioned area sensor of the sub system and photographing information inputted according to the photographer's intention; integration controlling means for controlling an integral time of the above-mentioned area sensor of the main system based on outputs of the above-mentioned monitor area; and arithmetic means for obtaining the distance to the subject based on outputs of the above-mentioned area sensor of the main system.

Moreover, a seventh aspect of the present invention discloses a camera comprising: an area sensor composed of a plurality of pixels for light-receiving an optical image in the photographing image plane; a selection circuit for determining a specific area in the above-mentioned area sensor; and an integration control circuit for controlling an integral time of output signals from the above-mentioned area sensor based on pixel outputs of the above-mentioned specific area selected by this selection circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a view showing part of a sensor array shown in FIG. 1 more precisely.

FIGS. 3A and 3B are time charts when the integration control is conducted by switching a switch shown in FIG. 2.

FIGS. 8A to 8C are views for explaining a concrete method for detecting whether the composition is lengthwise or widthwise, and whether or not the camera is facing upward.

FIGS. 9A to 9C are views for explaining added luminance distributions in the x direction and in the y direction when a scene is in the widthwise composition.

FIGS. 10A to 10C are views for explaining added luminance distributions in the x direction and in the y direction when a scene is in the lengthwise composition.

FIGS. 11A to 11C are views showing areas to be used as integration judgment areas.

DETAILED DESCRIPTION OF THE INVENTION

Figure 1A:
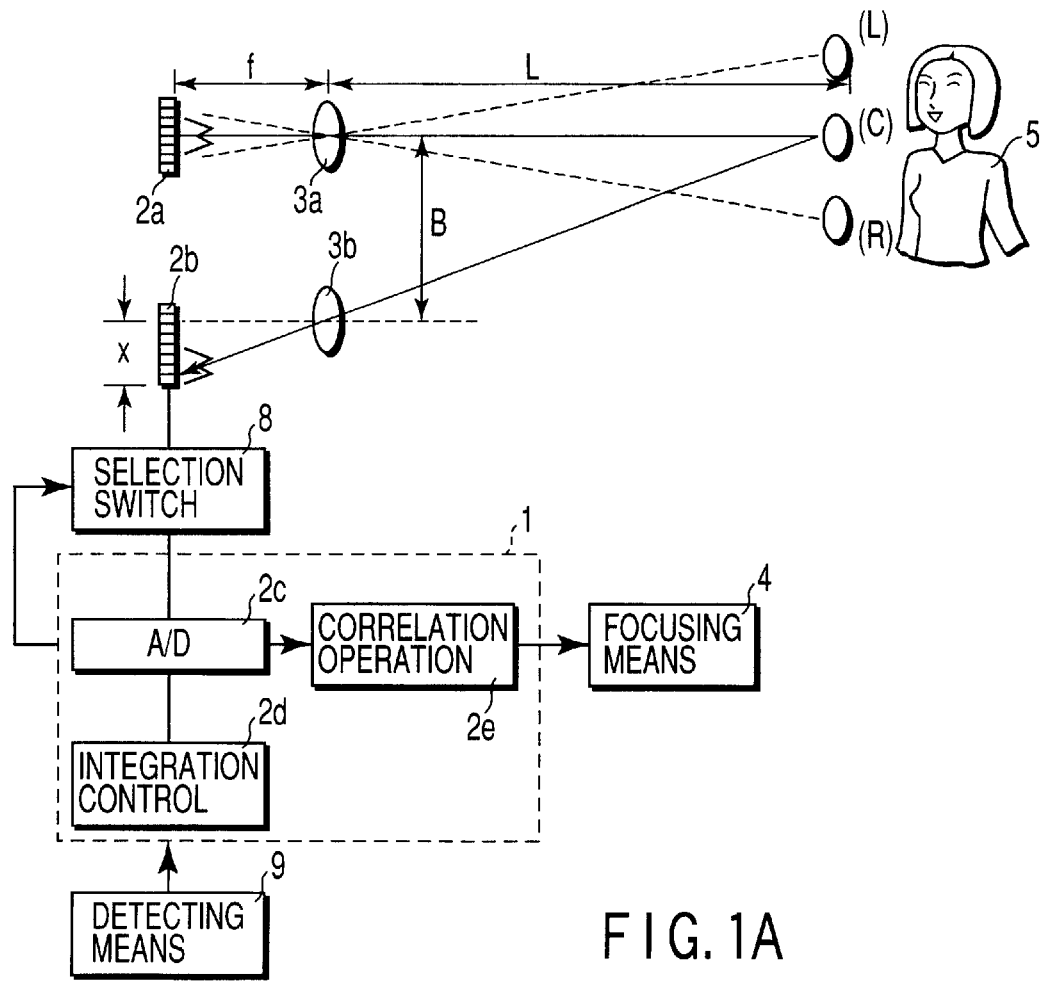
FIGS. 1A to 1C are block diagrams for explaining a method for performing the distance-measuring according to an embodiment of the present invention.

Hereafter, referring to the drawings, the embodiments according to the present invention will be described in detail.

Figure 1B:
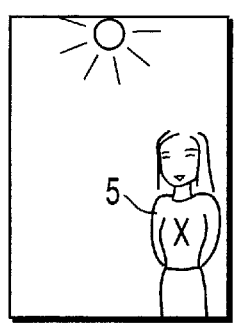
Figure 1C:
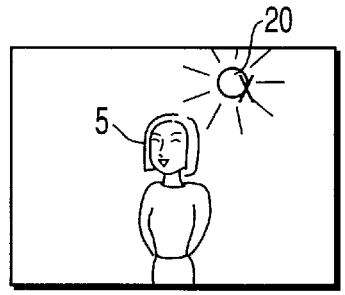

For example, in a composition like FIG. 1B, it is necessary to perform correct distance-measuring and carry out focusing to the point indicated the "x" mark in the image plane where the subject 5 exists and in this case the camera is required to catch the image at the position indicated by the "x" correctly. However, if the user alter the composition to one where the subject 5 exists in the center as in FIG. 1C, the "x" mark in the image plane moves to the upper part thereof, coming near to the sun 20, and consequently the camera is likely to respond to the brightness of the sun 20 and hence a probability that the image of the subject 5 which the user intends to take cannot be obtained properly becomes high. Thus, unless the image signals are not properly detected and controlled, it is impossible to photograph a correctly focused picture, no matter how many points in the image plane have been measured.

A method of this embodiment that solves such problems will be described below. First, using FIG. 1A, a method for finding the subject distance L will be described. Numerals 3a and 3b are a pair of light-receiving lenses arranged so as to have a parallax B and images of the subject 5 are formed on sensor arrays 2a, 2b with these lenses. These images are formed on relatively different positions on the two sensor arrays 2a, 2b due to the above-mentioned parallax B according to the principle of triangulation. If a difference x between these relative positions is detected, the subject distance L can be obtained by calculating the following equation, using the focal distance f of the light-receiving lenses and the above-mentioned parallax B, $L=(B \cdot f)/x$. Further, if operation controlling means (CPU) 1 serving as monitor selection means comprising a one-chip microcomputer etc. controls focusing means 4, photographing where the subject 5 is set in-focus can be performed.

A CPU 1 comprises an A/D converter 2c, integration controlling means 2d, correlation operation means 2e, and an A/D selection switch 8. Moreover, a numeral 9 denotes using state detecting means of the camera.

By the way, the above-mentioned difference x of the relative positions is calculated by the following method. The A/D converter 2c built into the CPU 1 converts an output of each sensor array into a digital signal, which is stored in memory (not shown in the figure) in the CPU 1. The CPU 1 conducts the correlation operation on these results with the correlation operation means 2e by using a predetermined program. The correlation operation is a method where two sets of outputs from two sensor arrays are made to undergo subtraction operation to find differences between corresponding outputs while the set of outputs is moved in a direction of sensor arrangement, and at an amount of displacement that gives smallest differences, the correlation is judged to be highest. A product of this amount of displacement in unit of the pitch of the sensor array and an actual value of the pitch is a value representing the difference x of the relative positions described above.

FIG. 2 is a view showing more precisely a construction of part of the above-mentioned sensor array. Symbols S1 to S4 denote light-receiving planes of light-receiving elements that constitute a sensor array and each of sensors S1 to S4 outputs a signal current in proportion to an amount of received light by a bias circuit 100 serving as a power supply. Signal currents of these elements are lead to integration amplifiers A1 to A4 when an integration start/stop switch 7a is ON, and electric voltage signals proportional to the amounts of received light are outputted to outputs of respective amplifiers when a reset switch 7b is OFF. If this results are read by the A/D converter 2c built into the CPU 1, after the correlation operation explained in FIG. 1A, the focusing can be carried out.

However, since the amount of light entering each of these sensors S1 to S4 may vary to various values according to the brightness of a scene and a color and the reflectance of the subject, an accurate integration control technology become prerequisite in order to control the amount of integrated electric signal obtained by integrating means with a limited dynamic measure to be within a proper value. For example, when the integration time is too short, integration results of the sensors become virtually flat, yielding no difference between the results, whereas when it is too long, integration results of the sensors become uniform due to saturation of a circuit.

As is evident from the explanation of the correlation calculation previously explained, if variation of the image over the sensor array is small, it is difficult to correlate two images obtained by two sensor arrays, and as a result correct distance-measuring cannot be performed.

To cope with this problem, in this embodiment, the integration result is monitored in real time by the CPU 1, and when the integration result reaches an proper level, the operation of the integration is made to stop. A maximum integral-value detection circuit 6 detects the maximum integral value among the integration outputs of the sensors S1 to S4 each of which is inputted by switching on a corresponding switch 7c and at the same time switching off other switches 7c.

FIG. 3A is a timing chart where these switches 7c are turned ON serially to conduct the integration control. While light is incident to a sensor array composed of the sensors S1 to S4, first the reset switch 7b is turned ON to effect the resetting of the outputs to a reference level, and the integration start/stop switch 7a is turned ON and the reset switch 7b is turned OFF, and consequently the integration is started at the timing of T1.

The output of the maximum integral-value detection circuit 6, which is the most significant integral value of the sensor output (maximum value) that was selected when the A/D selection switch 8 was connected to the maximum integral-value detection circuit 6, is inputted into the A/D converter 2c of the CPU 1. The CPU 1 monitors each output sequentially by driving the A/D converter 2c (FIG. 3A), and controls in such a way that an integration output for each sensor doesn't exceed the dynamic measure of the circuit by turning off the integration start/stop switch 7a at a critical timing T2 when the above-mentioned maximum value is within the dynamic measure. After the integration is stopped, by controlling the switching of the A/D selection switch 8 to A/D convert the integration outputs of the sensors S1, S2, S3, S4, the CPU 1 can monitor each sensor output sequentially.

The image signal thus obtained has such a profile as shown in FIG. 3B, indicating a low output for a dark position and a high output for a bright position. By a method like this, the distance-measuring apparatus for a camera can obtain a proper image signal.

Moreover, by controlling the switch 7c by the CPU 1, predetermined sensor outputs can be connected to the maximum integral-value detection circuit 6. Therefore, even if light from the sun enters one sensor, for example, the sensor S1, among four sensors S1 to S4 like an example of FIG. 1C, it is unlikely to occur that the integration control is governed by intense light from the sun if this sensor S1 is controlled not to be connected to the maximum integral-value detection circuit 6. In this way, it can be prevented that the integration control is halted before the image signal of a normal subject is obtained due to the influence of direct light from the sun when the integration is being monitored and as a result the correct distance-measuring is hampered.

Similar malfunction can be occurred even if the maximum integral-value detection circuit 6 is a circuit that detects not the maximum value but a difference between the maximum value and the minimum value or an averaged value. To prevent this, in this embodiment, the integration judgment area is changed according to a scene by appropriately modifying the operation of this switch 7c.

By the way, in the construction of FIG. 1A, if beams of light shown by dotted lines from the light-receiving lens 3a are used, points (L), (R) in the image plane other than the center point (c), namely the points displaced in the direction of the base line, can be measured.

Figure 4A:
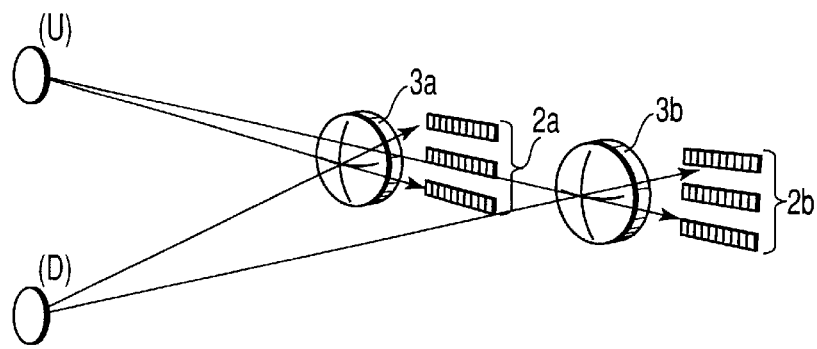
FIGS. 4A and 4B are views for explaining the embodiment where a measurable area is expanded to several areas by adding sensor arrays both in a direction of ground line and in a vertical direction.
Figure 4B:
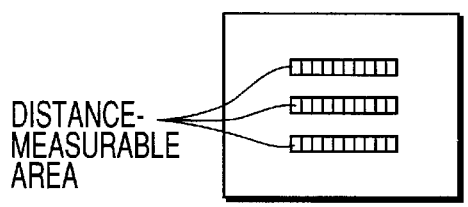

Further, if two sets of two sensor arrays are added at points on lines perpendicular to the direction of the base line, just above and under the sensor arrays 2a, 2b at the rear of the light-receiving lenses 3a, 3b as in FIG. 4A, points (U), (D) on lines perpendicular to the direction of the base line can be measured as indicated by the beams of light in FIG. 4A. Therefore, at this time, the monitor areas of the sensor array have been expanded as in FIG. 4B, so that more points in the image plane can be measured.

Figure 5A:
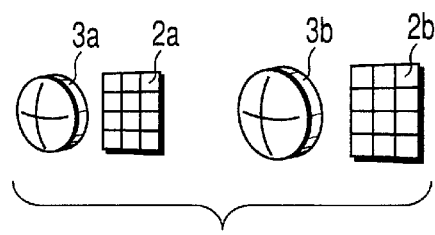
FIGS. 5A to 5C are views for explaining the embodiment where a distance-measuring area is expanded to the whole image plane by using an area sensor.
Figure 5B:
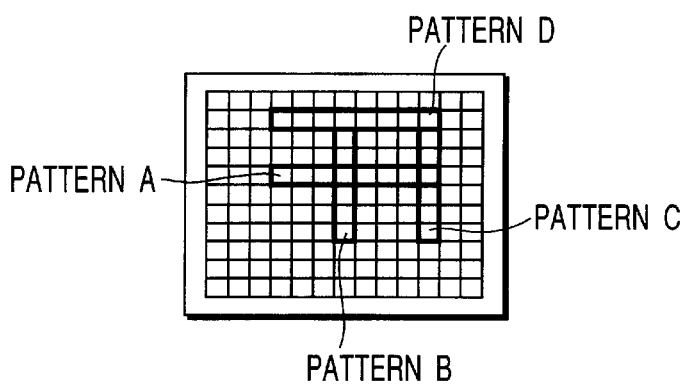
Figure 5C:
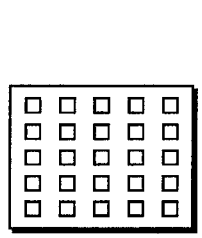

The inventors considered that, if this idea is extended to such a scheme where not a single piece or three pieces of the line sensors but the so-called area sensor that is formed by arranging sensors consecutively and two-dimensionally, as shown in FIG. 5A, is used, every positions in the whole image plane can be monitored and, for example, the number of measurable points can be increased up to 30-points or more as in FIG. 5C.

If with such a contrivance, the number of distance-measuring points is increased, the distance-measuring apparatus that can perform correct distance-measuring at a whichever position in the image plane the main subject exists can be provided. For example, even in a composition as in FIG. 6c where a person exists at a corner of the image plane, the camera capable of carrying out exact focusing can be obtained.

However, as described already, the wider the distance-measuring area, the more susceptible the distance-measuring apparatus become to light of miscellaneous subjects when conducting the integration control, and as a side effect the probability of running into false distance-measuring will increase. Therefore, in this embodiment, the distance-measuring area is expanded to the whole image plane as in FIG. 5B while the integration judgment areas are limited only to four monitor sensor patterns (which identify respective monitor means), of patterns A to D and the integration control is conducted with only necessary portion of light as less as possible.

Figure 6A:
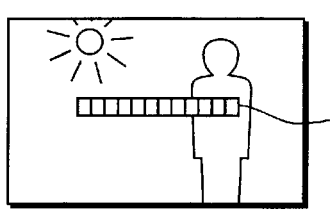
FIGS. 6A to 6D are views for explaining a procedure of conducting the integration control using an optimum integration judgment area according to a photographing situation for each scene.
Figure 6B:
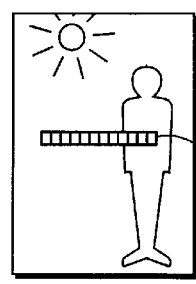
Figure 6C:
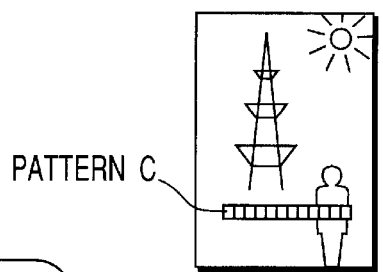
Figure 6D:
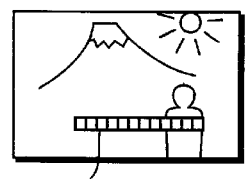

If in each of scenes like FIGS. 6A to 6D, whether the attitude of the camera is lengthwise or widthwise is judged, also whether or not the camera is facing upward is judged, and an optimum integration judgment area for its photographing situation is used to conduct the integration control, appropriate integration control can be conducted without being affected by direct light from the sun in the figure. For example, FIG. 6A shows a case where the composition is widthwise and the camera doesn't face upward, the integration judgment is conducted using the integration judgment area of the pattern A and the integration is stopped. FIG. 6B shows a case where the composition is lengthwise and the camera doesn't face upward, the integration judgment area of the pattern B is selected. Moreover, among cases where the camera is held upward, there is often a case where the user wishes to take in a high building or mountain in the image plane and also to focus a person in front thereof however, in such photographing, the user prefers to use a wide angle of view in photographing, and thus, for example, in a case with a zoom lens mounted camera, the user prefers to photograph a picture with a wide-angle setting of the lens, scarcely with a telephoto setting of the lens. In this case, it is preferable that the integration judgment area is shifted downward, as in FIGS. 6C and 6D, to conduct the integration control. This is because it is often the case that there exists a subject having a higher brightness than the main subject, such as the sky, the sun, etc., in the middle and upper part of the image plane.

The detection of whether the composition is lengthwise or widthwise mentioned above and the detection of upward facing of the camera are done by using state detecting means 9 of a camera shown in FIG. 1A. A concrete method will be described below. As in FIGS. 8A to 8C, the camera is manufactured to incorporate therein a case 51 which houses a fluid conductive material 52 such as mercury and the CPU is configured to judge whether or not two of a plurality of electrodes 53 ($\alpha$ to $\delta$) that are inserted into the inside of this case 51 are short-circuited by the fluid conductive material 52, and thereby the using state of the camera can be detected. For example, if the electrode $\beta$ and $\gamma$ are short-circuited, the camera can be judged to be widthwise; if the electrode $\beta$ and $\alpha$ are short-circuited, judged to be lengthwise; and if $\beta$ and $\gamma$ are short-circuited, the camera is facing upward. Moreover, since generally the zoom lens mounted camera has a zooming position detection function because of the necessity of conducting compensation control of a focusing position which may vary due to the zooming, and if this function is applied for detection purpose, the camera can judges whether the camera is in the telephoto setting or in the wide-angle setting of the lens.

Figure 7:
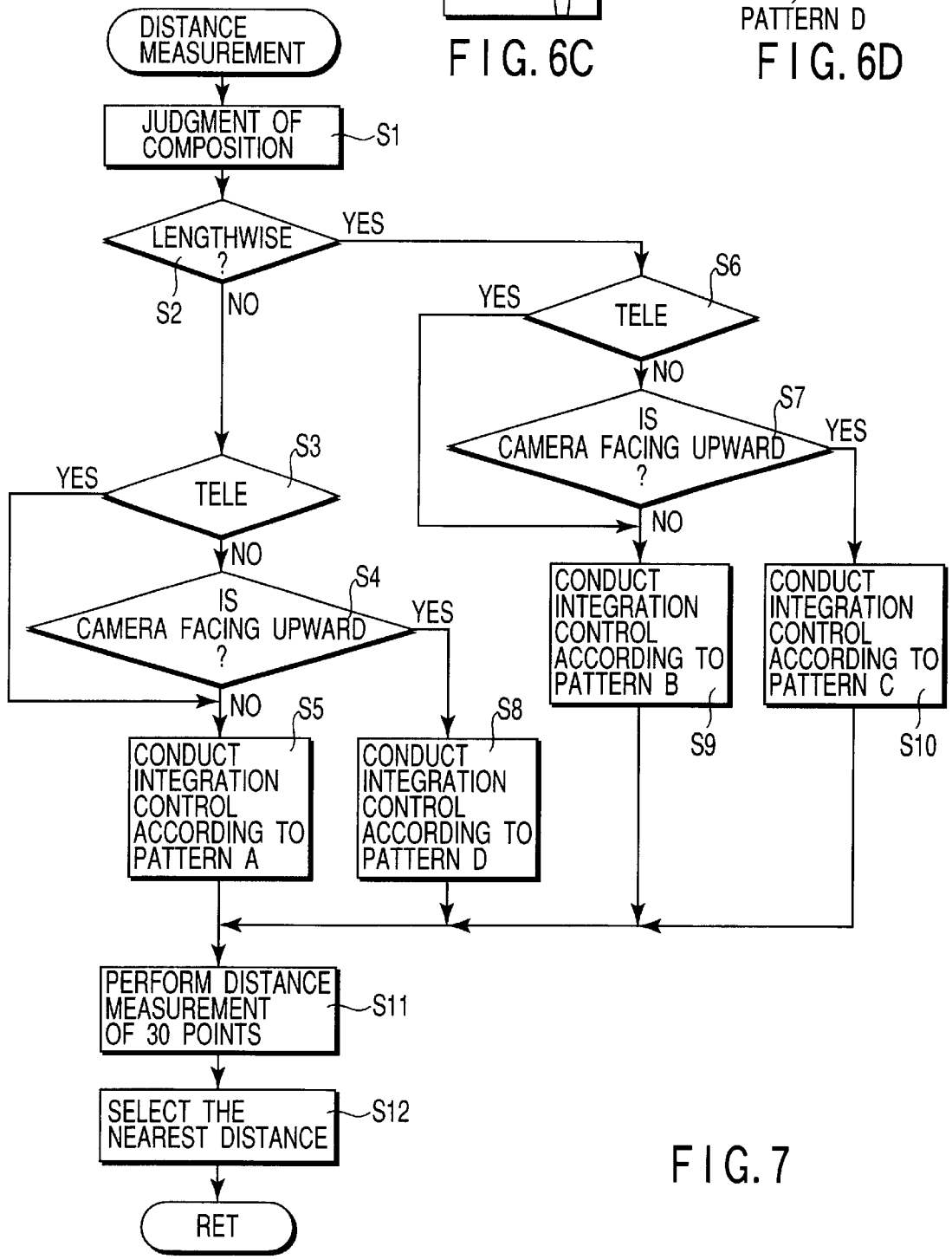
FIG. 7 is a flowchart for explaining details of a sub routine of distance-measuring for making an optimum integration judgment.

FIG. 7 is a flowchart for explaining the details of the sub routine of distance-measuring for making the optimum integration judgment mentioned above.

First, the composition is judged at step S1, and then whether or not the attitude of the camera is lengthwise is judged (step S2). Here, in case of YES, whether or not the camera is in the telephoto setting of the lens is judged at step S6, and in case of YES, the flow proceeds to step S9, where the integration control is conducted using the pattern B (FIG. 6B). In case of NO at step S6, whether or not the camera is facing upward is judged at step S7, and in case of upward-facing, the integration control is conducted using the pattern C (FIG. 6C) at step S10; in case of not upward-facing of the camera, the integration control is conducted using pattern B at step S9.

On the other hand, in case that the attitude is judged to be not lengthwise by the judgment of step S2, whether or not the camera is in the telephoto setting of the lens is judged at step S3, and in case of YES the flow proceeds to step S5, where the integration control is conducted using the pattern A (FIG. 6A). In case of NO at step S3, whether the camera is facing upward is judged at step S4, and in case of upward-facing the integration control is conducted using the pattern D (FIG. 6D) at step S8; in case of not upward-facing, the integration control is conducted using the pattern A (FIG. 6A) at step S5.

After steps S5, S8, S9, S10, the flow proceeds to step S11, where the distance-measuring of thirty points is performed, then the nearest distance is selected (step S12), and the flow returns.

If the CPU executes the sub routine of distance-measuring through such a flow as mentioned above, the subject image can be detected correctly by conducting an appropriate integration judgment for each scene. Further after the integration control, if the CPU calculates correlation of the image, performs the distance-measuring, for example, as in FIG. 5C, for the thirty points in the image plane, and assumes the nearest distance to be the distance of the main subject, correct focusing becomes possible.

Alternatively, the CPU may be configured to select the optimum integration judgment area not only based on the composition judgment mentioned above but also based on the composition judgment plus outputs of the area sensor as in FIGS. 9A to 9C and FIGS. 10A to 10C. For example, in the widthwise composition as shown in FIG. 9A, since an upper half part is the sky, the main subject is likely to exist somewhere in the lower half part. In order to judge this situation automatically, a necessary procedure is that all the elements of the area sensor are specified in the x and y coordinates, an added luminance distribution along the y axis is calculated by adding outputs of all pixels having the same y value in the x direction and shown in a graph as in FIG. 9B, an added luminance distribution along the x axis is calculated by adding outputs of all pixels having the same x value in the y direction and shown in a graph as in FIG. 9C, and both added luminance distributions are compared. In FIG. 9B, since parts corresponding to the sky and the ground are separated in the added luminance distribution along the y axis, a large change of the luminance, indicated by $\Delta BV$, is observed; in FIG. 9C, since parts corresponding to the sky and the ground are merged in the added luminance distribution along the x axis, only a monotonous variation of the luminance is observed. A position where this large variation of the luminance occurs is detected as position yB.

On the contrary, in the lengthwise composition as shown in FIG. 10A, the added luminance distribution along the y axis shows a large variation of $\Delta BV$ (FIG. 10B), the added luminance distribution for the pixels having the same y value along the x axis shows only a monotonous variation (FIG. 10C), which is contrary to the case of FIG. 9A. Like in the case of FIGS. 9A to 9C, a position where this large variation of the luminance occurs is named as position xB.

Figure 12:
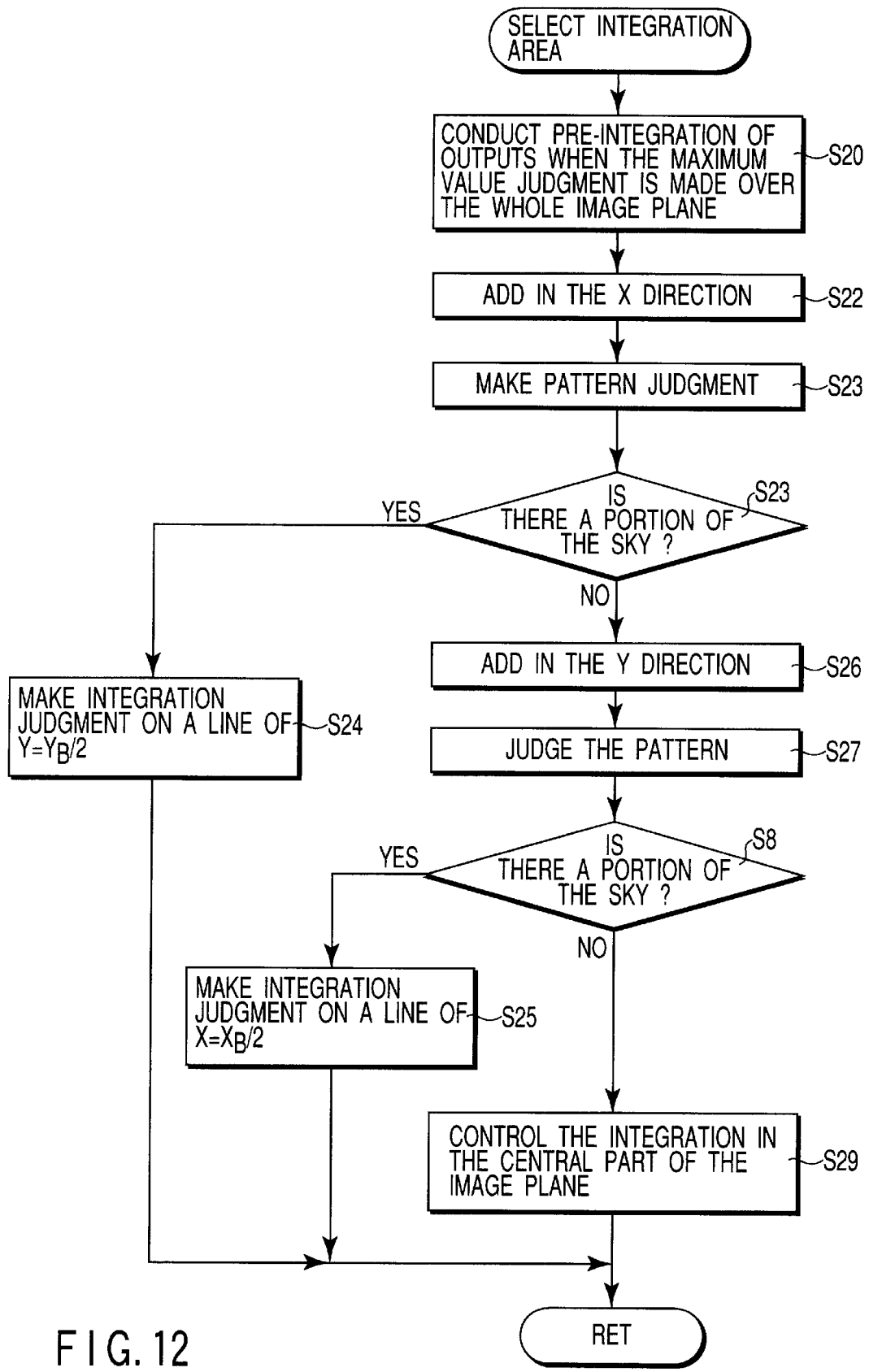
FIG. 12 is a flowchart which shows the steps for the integration area selection.

If using this characteristic the integration area is selected through the flow as shown by steps S20 to S29 in FIG. 12, the integration judgment area can be set in the image plane excluding the part of the sky as in FIGS. 11A and 11B. If neither xB nor yB can be detected, the CPU may conduct the integration termination judgment in the central part of the image plane, as in FIG. 11C, where the main subject is likely to exist.

If this embodiment is adopted, the composition judgment as in FIGS. 8A to 8C and a switch for camera inclination judgment become unnecessary. However, in order to check the situation of the image plane first, a pre-integration operation for selecting the integration judgment area is necessary as indicated by the first step (step S20) of FIG. 12. To do this, the integration control may be conducted using a pixel outputting the maximum output among sensor pixels of the whole image plane, or alternatively the integration control may be conducted based on an average value that is obtained by addition of the outputs of the whole pixels.

Figure 13A:
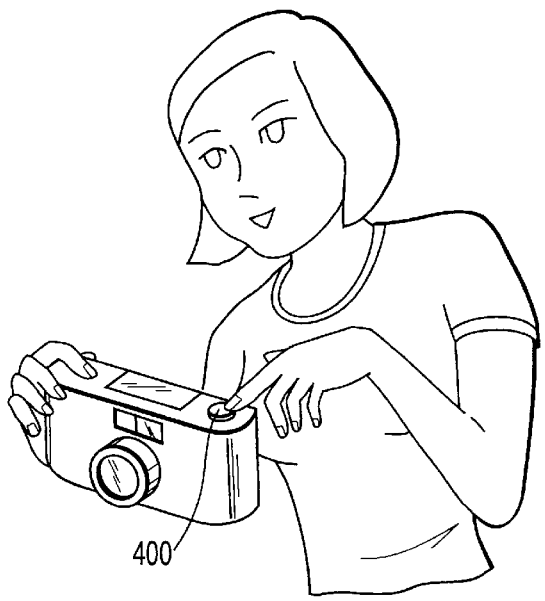
FIGS. 13A to 13D are views for explaining an embodiment where the user manipulates a mode selection switch of the camera to select a mode.
Figure 13B:
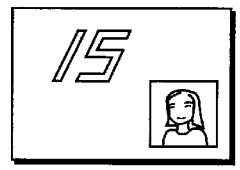
Figure 13C:
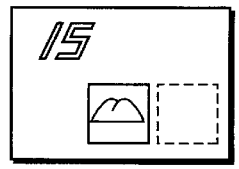
Figure 13D:
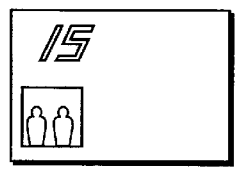

Further, the integration judgment area may be changed according to a photographing mode as in FIG. 13A that the user selected by operating a mode selection switch 400 of the camera as setting means. FIGS. 13B, 13C, and 13D illustrate designed patterns of an LCD attached on coated upper surface of the camera, showing that the display is changed by the mode selection. The user is expected to manipulate the mode selection switch 400 of a camera while seeing this display.

Figure 15A:
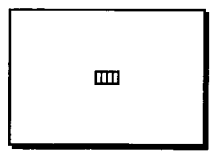
FIGS. 15A to 15C are views showing various kinds of integration monitor areas.

Here, FIG. 13B is a portrait mode and this mode, which involves the setting such as opening the diaphragm to defocus the background etc., is used when photographing a person finely. At this occasion, since the person is very likely to exist in the center of the image plane, only the central part of the image plane is specified as the integration monitor area as in FIG. 15A. When the user presses the mode selection switch 400, LCD display will switch to a mode as in FIG. 13C and a portrait display will disappear. This mode is a scenery mode where the focusing is set to the long distance and the strobe function is disabled because it is too far for the strobe light to reach. In this case, the integration judgment may be made using the signals of the pixels of the whole image plane. In this mode, there is known a technology where the focusing is set to the infinity without performing the distance-measuring with an intention of covering all distant subjects with the depth of field, but in this embodiment the camera capable of switching the subject distance to either a few tens meters or a few hundreds meters is postulated.

Figure 15B:
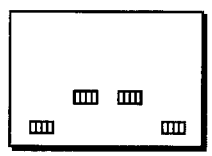
Figure 15C:
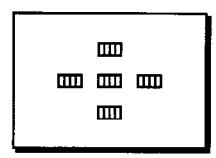

FIG. 13D shows a mode to be selected when photographing a scene with two persons standing in the image plane and called a two-person mode. In this case, since only a background exists in the central part of the image plane, the integration control pixels are not provided here but monitor areas are provided in adjacent areas excluding the central part as in FIG. 15B. When none of the modes is selected, the integration control area that is intended to weight the central part as in FIG. 15C is used. This is because there is a high probability that the main subject exists in the central part of the image plane.

Figure 14:
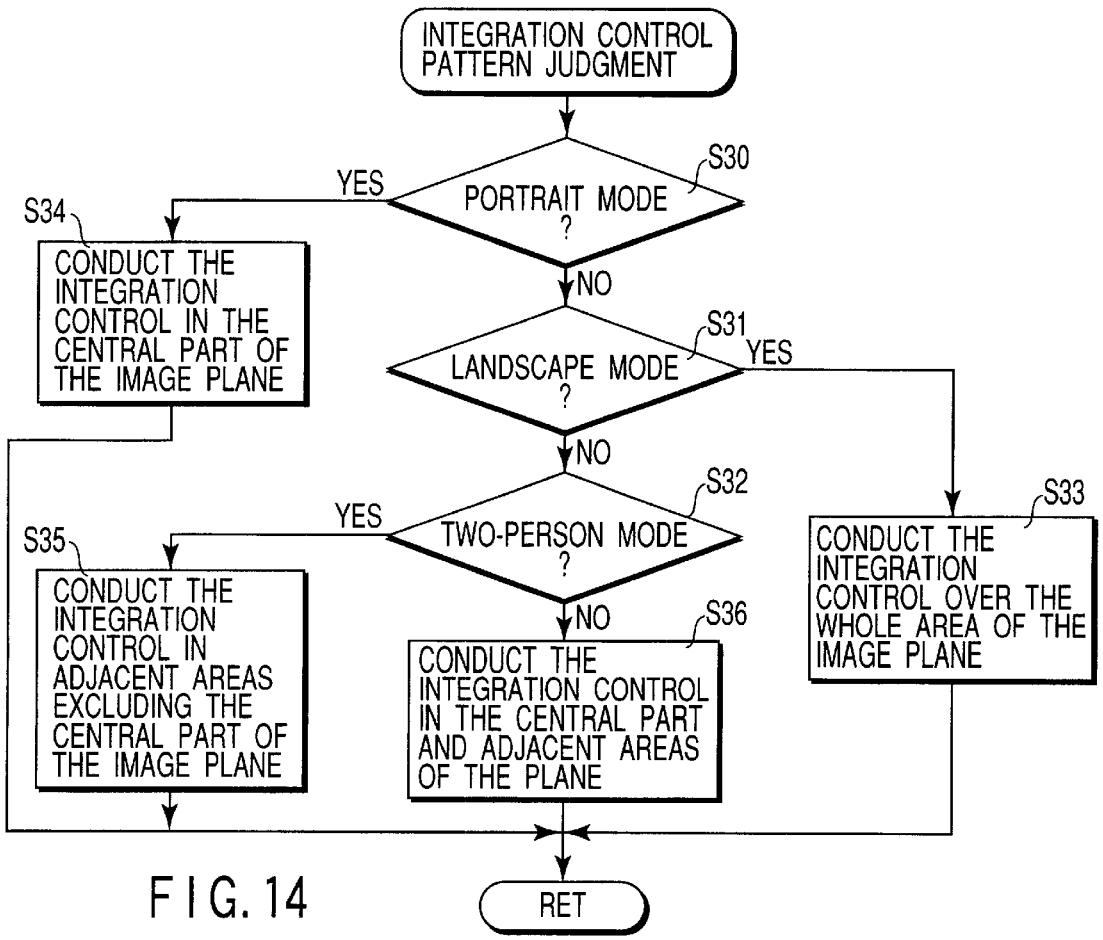
FIG. 14 is a flowchart which shows the steps for a process of switching integration control area.

Steps S30 to S36 in the flowchart of FIG. 14 show the details of the processing wherein the integration control area is switched according to the above-mentioned mode selection.

First, whether or not the mode is the portrait mode is judged at step S30, and in case of YES the integration control is conducted in the central part of the image plane (step S34) and the flow returns. In case of NO, whether or not the mode is a scenery mode (step S31), and in case of YES the integration control is conducted in the whole area and the flow returns (step S33).

In case of NO at step S31, whether or not the mode is the two-person mode is judged at step S32, and in case of YES the integration control is conducted at adjacent areas excluding the central part of the image plane (step S35) and the flow returns. In case of NO at step S32, the integration control is conducted both at the central part of the image plane and at the adjacent areas at step S36 and the flow returns.

According to this embodiment, there is a merit that the user can make the user's intention have influence on the camera at the time of photographing, and thus the user can make the camera perform the distance-measuring and carry out focusing with an easy conscience. Moreover, this embodiment eliminates the need for a switch as in FIGS. 8A to 8C and pre-integration (step S20) as in FIG. 12. Although in the actual production, a control program for a camera is designed by combining the contrivances of first and second embodiments in addition to these contrivances, but here to distinguish the intention and difference of the contrivances, each of the contrivances is explained in the form of each separate embodiment.

Further, the camera may be configured in such a way that the arrangement of integration judgment areas is switched in response to whether the camera is being held lengthwise or widthwise that is, that the integration judgment areas are always provided along the two sides of a triangle that extends toward the bottom of the image plane, as in FIGS.

16A to 16D. With this arrangement, it becomes easy to monitor the main subject because it is difficult for the sun to effect the lower part of the image plane, the width of a person's shoulder is wider than the width of the person's face, and there is often the case where the position of a person is likely to be out of the center in the image plane of a composition where a scenery is taken in to one half or so of the image plane. However, since the image plane is hardly influenced by the sun when being indoors etc., the integration judgment may be made using only the integration judgment area in the central part as in FIGS. 16E and 16F.

Figure 16A:
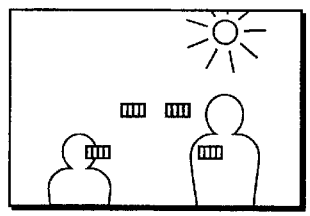
FIGS. 16A to 16F are views showing other examples of the integration judgment areas.
Figure 16B:
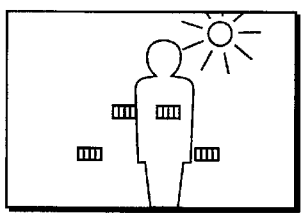
Figure 16C:
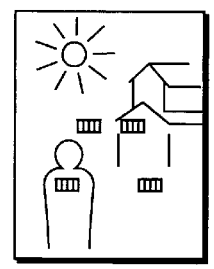
Figure 16D:
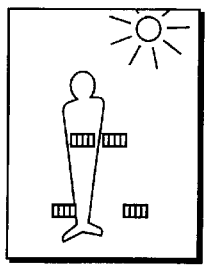
Figure 16E:
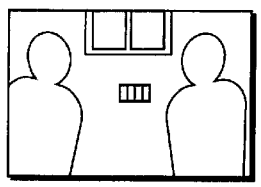
Figure 16F:
Figure 17:
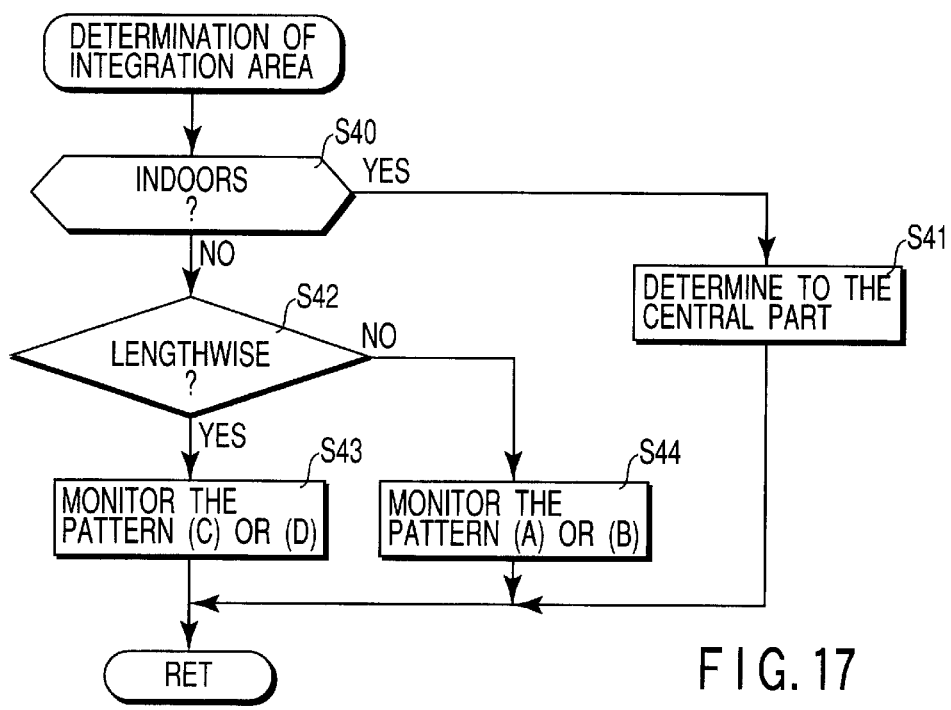
FIG. 17 is a flowchart for describing the steps for determining the integration area explained in FIGS. 16A to 16F.

Steps S40 to S44 in the flowchart of FIG. 17 show the steps that determines the above-mentioned integration area. First, whether or not the camera is indoors is judged at step S40, and in case of being indoors the monitor area is determined to be in the central part of the image plane as shown in FIGS. 16E and 16F (step S41). Moreover, in case of being not indoors at the step S40, whether or not the composition is lengthwise is judged (step S42), and in case of YES the flow proceeds to step S43, where the integration area of the pattern of FIG. 16C or FIG. 16D is monitored. In case of NO at step S42, that is, the composition is widthwise, the flow proceeds to the step S44, where the integration area of the pattern of FIG. 16A or 16B is monitored.

Figure 18A:
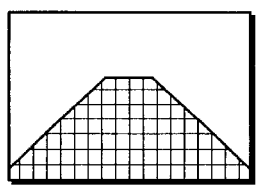
FIGS. 18A and 18B are views showing a mountain-like integration judgment area set in accordance with a detection result of whether the composition in lengthwise or widthwise.
Figure 18B:
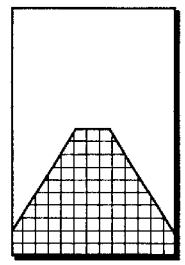

Furthermore, if such an idea is extended, a mountain-like integration judgment area, as in FIGS. 18A and 18B, may be set according to the detection result of whether the composition is lengthwise or widthwise. This is because such a situation is postulated that the more upper the position in the image plane, the more susceptible to the sun and illumination and there is a high probability that a person exists in the central part of the image plane. With the contrivances like this, the present invention can provide a distance-measuring apparatus where with correct image signals can be obtained and correct focusing can be carried out wherever the main subject exists.

In the foregoing embodiment, an example that uses only the so-called passive AF is described. However, applying the idea of the present invention, a higher-performance distance-measuring apparatus that uses the area sensor and light-projecting means can de designed.

Figure 19A:
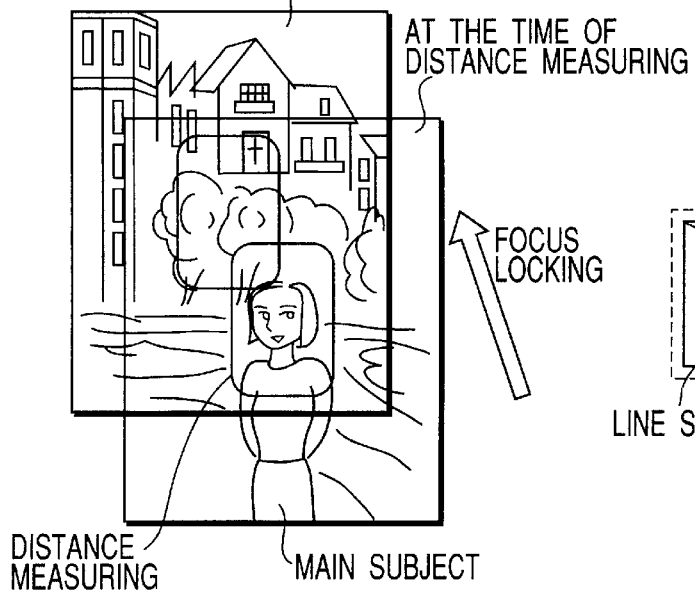
FIGS. 19A and 19B are views for explaining a focus lock operation.
Figure 19B:
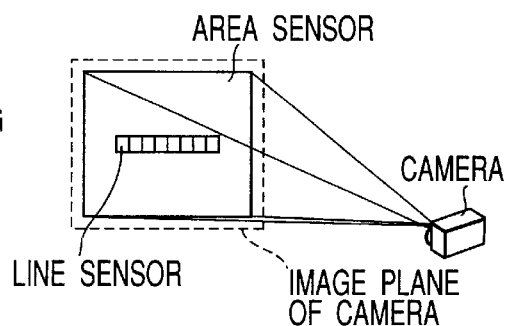

In the distance-measuring by the conventional line sensor, as in FIG. 19B, only a narrow area in the central part of the image plane of the camera, which consists of pixels on a line, can be measured. However, since the area sensor is formed by arranging line sensors two-dimensionally as explained previously, the area sensor can expand the distance-measuring area almost as wide as the image plane of the camera.

Therefore, when the user wishes to photograph a composition as shown by the uppermost figure of FIG. 19A in a scene like FIG. 19A, it is necessary for the photographer to manipulate a two-stage operation (focus lock operation) that expects the photographer to first press a release button halfway while framing the main subject in the center of the image plane to effect the distance-measuring and then press the release button completely after holding the camera so as to frame an intended composition in the image plane. However, this operation lacks capability of rapid photographing because of a troublesome preliminary operation before actual photographing.

Here, if the area sensor is used to widen the measurable region, this modification makes possible to measure the main subject existing at an end of the image plane, even in such a scene as of FIG. 19A.

However, even with this technology, other technology whereby the position of the main subject is detected correctly becomes much more essential in proportion to the increase in the number of measurable points. When the number of measurable points increases extremely, it will take much time to examine each points sequentially and in the worst case the examination needs a longer time than the focus lock. If so, the area sensor has an adverse effect on the distance-measuring and its demerit is so much worse by the fact that the area sensor is much expensive than the line sensor.

Figure 20A:
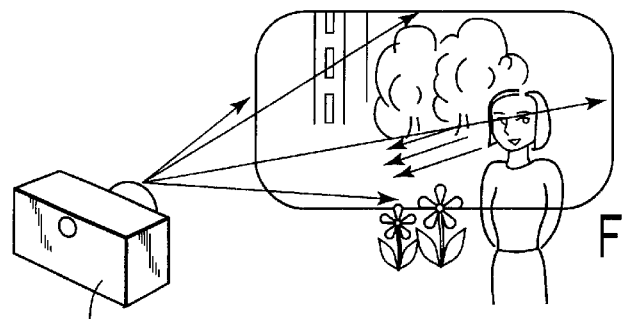
FIGS. 20A to 20C are views for explaining a method for rapidly detecting a position of a main subject.
Figure 20B:
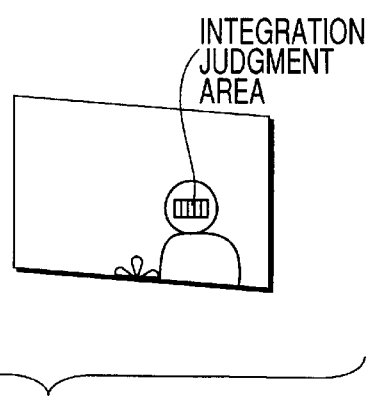
Figure 20C:
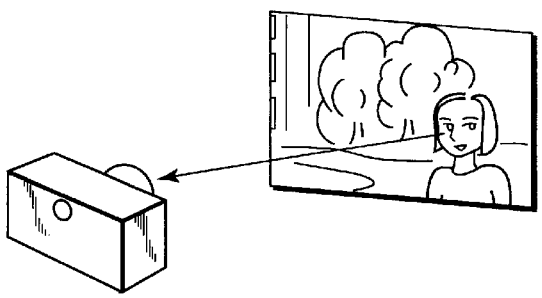

To cope with this problem, an embodiment that can detect the position of the main subject much faster will be described, referring to FIGS. 20A to 20C. First, the camera emits light widely to a region corresponding to the image plane prior to the distance-measuring as in FIG. 20A. At this time, the reflect light signal enters the area sensor according to the distance of the subject. If the distribution of the reflected light on the area sensor is shown diagrammatically, it will be like FIG. 20B.

That is, since miscellaneous backgrounds locate at a long distance from the camera, their reflected signal light scarcely returns to the camera. On the contrary, since the reflected signal light returns from a person whose subject length may be relatively short and flowers in front of the person, a pattern on the area sensor is extremely simplified as in FIG. 20B. If the microcomputer of the camera conducts the arithmetic and control operation of these signals of the pattern, which have been almost binarized, according to a predetermined pattern judgment sequence, the CPU can judge in which position the subject exists and hence can determine the integration area and specify the distance-measuring points for the following integration. If according to this position judgment, the integration and the distance-measuring whose distance-measuring point and integration judgment areas have been specified are performed as in FIG. 20C, an AF with which the focusing on the main subject can be made in a flash wherever the main subject exists can be provided.

For a distance-measuring method in this occasion, the distance-measuring by the so-called active method where distance-measuring light is projected again and the distance-measuring by the passive method where no distance-measuring light is projected can be used and either of both may be switched according to the situation at such a time.

Next, referring to FIGS. 21A and 21B, a new type of auto focusing technology called super combination AF will be described. The name of super combination AF doesn't come from a mere-hybrid combination of the active method and the passive method but is given because the two methods are used to conduct an operation up to the main subject detection.

Figure 21A:
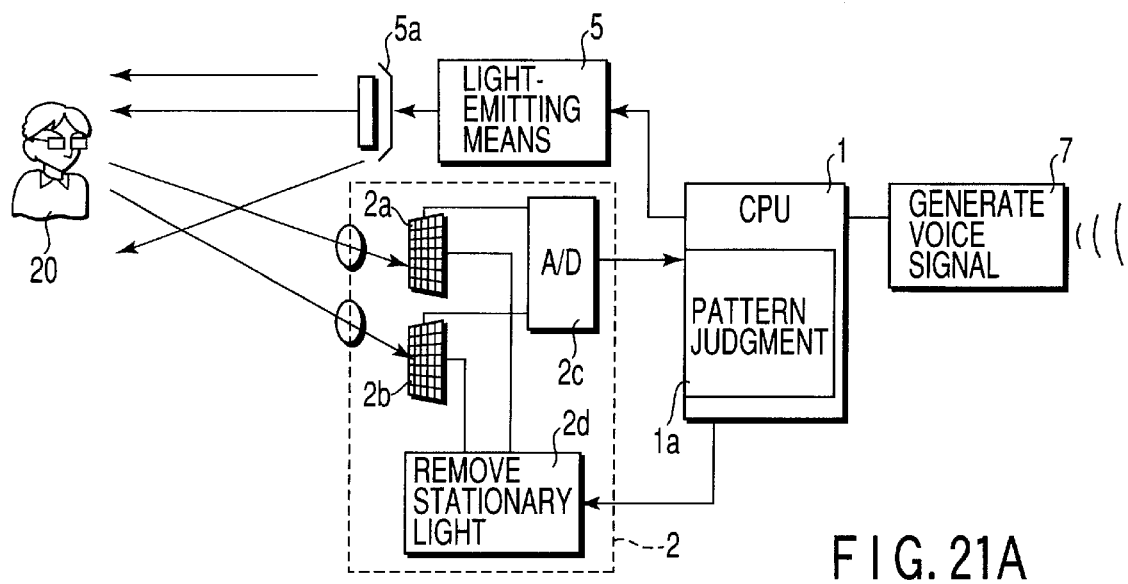
FIGS. 21A to 21D are views showing a construction of a super combination AF (Auto Focusing).

FIG. 21A illustrates a situation where the subject 20 is being measured by means of this type of AF, showing main constituents in block diagrams. Light from the subject is transmitted through two light-receiving lenses and is incident on the two area sensors 2a, 2b. These area sensors 2a, 2b are for receiving the subject image and conducting photoelectric conversion thereof, and an output of each pixel is A/D converted into a digital value by the A/D converter 2c and inputted into a microcomputer (CPU) for camera control 1.

Moreover, these area sensors 2a, 2b are connected to a stationary light removal circuit 2d, and this circuit is configured in such a way that, when the circuit is being under control, a DC-like electric signal of light entering steadily from the subject is removed and only a pulsed output signal of pulsed light from a light source 5a such as a strobe etc. can be obtained.

Figure 21B:
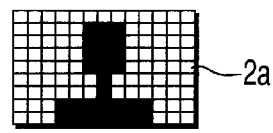

Therefore, if the CPU 1 controls the emission means 5 to make the light source 5a emit light toward the subject 20 while the stationary light removal circuit is being operated, its reflected signal light returns from the subject 20 and forms an image as in FIG. 21B on the area sensor 2a. The black part indicates a part on which the light is incident. A software program for analyzing patterns of images on the area sensor is built into the CPU 1, and if the program can judge the pattern to be a profile of a person, it can recognize that it is the main subject.

Figure 21C:
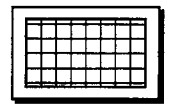
Figure 21D:
Figure 22:
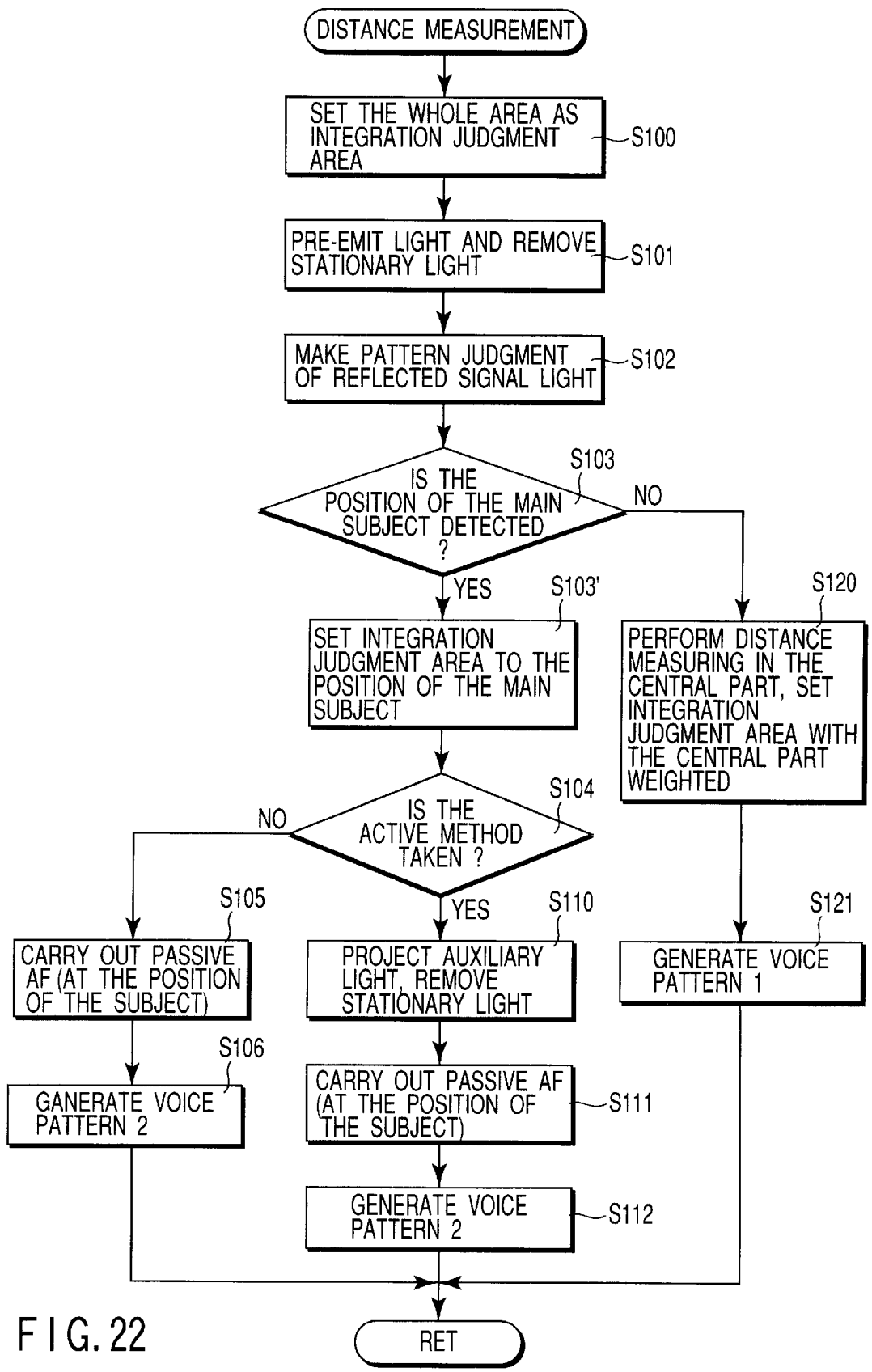
FIG. 22 is a flowchart for explaining an operation of a construction shown in FIGS. 21A to 21D.

FIG. 22 is a flowchart for performing the above-mentioned distance-measuring operation. First, steps S100 to S102 are for part of the operation where the integration judgment area is set widely (see FIG. 21C), the light source 5a is made to emit light prior to the distance-measuring, and only a pattern of its reflected signal light is integrated to be taken out (see FIG. 21B). If this pattern is judged to be the main subject because of its shape indicating a person and the like, the judgment at step S103 gives YES and the flow branches to step S103. Here, to take out only the image signal of the main subject, a narrow integration judgment area as in FIG. 21D is set.

At step S104, whether or not light-transformed signals that form the above-mentioned pattern are weak and whether or not these signals have sufficient contrast to one another are judged, and a selection is done regarding which type of distance-measuring is conducted as the distance-measuring method, the active type (where the signal light is emitted from the camera and its reflected signal light is used to perform the distance-measuring) or the passive type (where the distance-measuring is performed based on the image signals of the subject).

That is, when the contrast of the image signals are weak, the flow branches to step S110, where distance-measuring light is emitted again and the active AF based on its reflected signal light is carried out to the position of the main subject as a priority area.

Moreover, when the reflected signal light is judged to be weak at step S104, the flow branches to step S105 considering that the passive AF is more suitable. At step S105, the passive-type distance-measuring is performed using principally the image signals at the position of the main subject that have been obtained already. The image signals used here are those that were integrated principally for the main subject.

Moreover, when the main subject was not found at step S103, the flow branches to step S120, where the integration judgment area is set to the central part as a priority area and brightness information etc. are added, then either the active method or the passive method is selected, and finally the central part of the image plane where the probability of the existence of the subject is high is measured as the priority area.

If the CPU 1 selects a voice pattern (at steps S106, S112, S121) and control its output in accordance with the distance-measuring method or YES/NO of the judgment of the main subject, it is easy for the user to understand what is going on in the camera; therefore the camera capable of performing the distance-measuring with a sense of security can be provided, while appealing the features of this super combination AF.

Figure 23A:
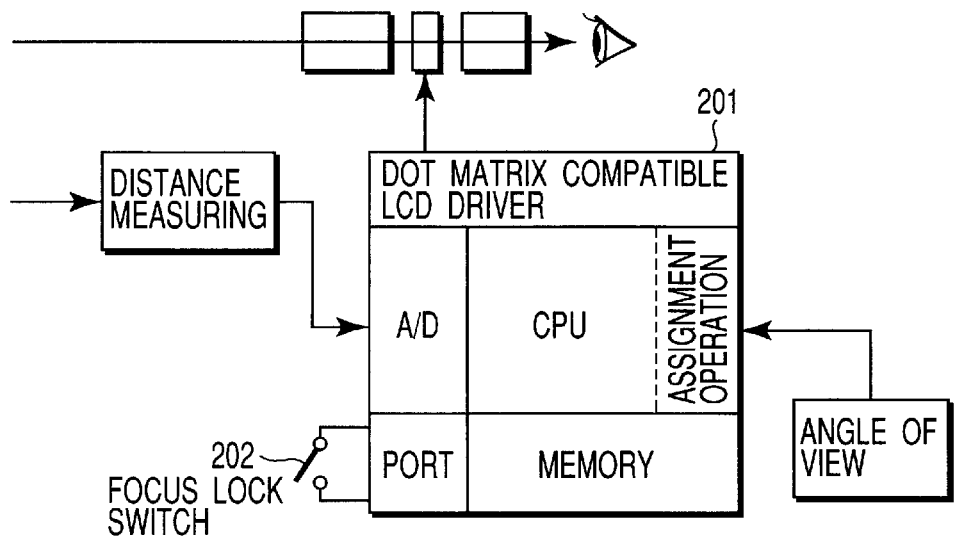
FIGS. 23A and 23B are views for explaining an embodiment where a matrix LCD (Liquid Crystal Display) driver is built into a CPU and the transmittance of an LCD in a finder is switched according to the distance-measuring result.

Furthermore, if a matrix LCD driver is built into the CPU as in FIG. 23A and the transmittance of the LCD in the finder is made to be switched according to the measurement result, the camera can be designed so as to be easier for the user to recognize.

Figure 23B:
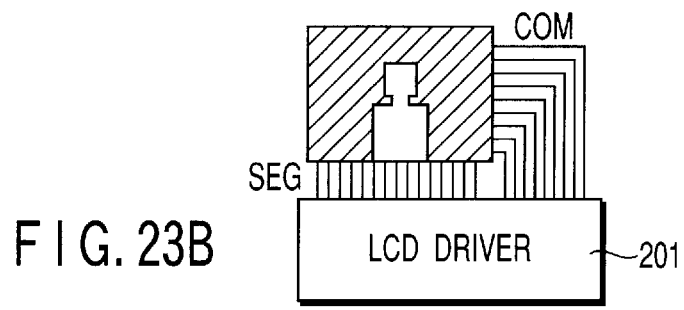
Figure 24:
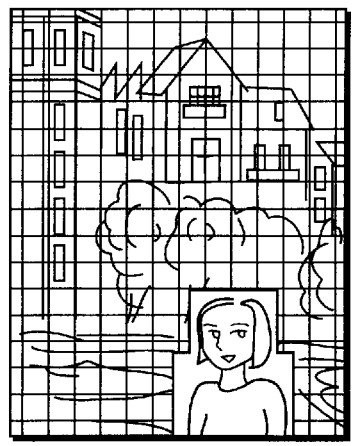
FIG. 24 is a view showing a focusing area that is indicated clearly in the finder for the photographer by the method shown in FIGS. 23A and 23B.

For example, as in FIG. 23B, if the LCD driver 201 designates a transparent part of a form corresponding to the subject image and controls selection signals of the common and the segment, the user can monitor an area in the finder on which the camera is going to carry out focusing as in FIG. 24. Here, shown is an example where such control is done that the transparent area is designated in accordance with the image and the transmittance of other areas is reduced.

Figure 25:
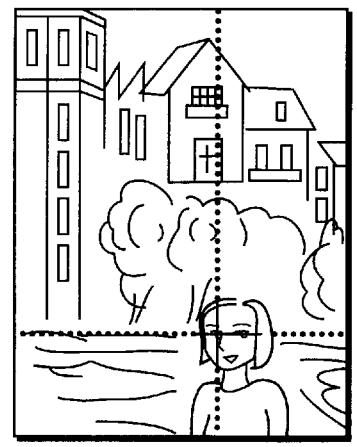
FIG. 25 is a view showing the distance-measuring point marked by a crossing of horizontal and vertical lines.

Moreover, as in FIG. 25, a distance-measuring point may be indicated with a crossing of horizontal and vertical lines. A necessary procedure to do this is only that any segments of the LCD in the finder whose x coordinate or y coordinate is equal to its counterpart of the coordinates of the distance-measuring point are all set to be non-transparent. The details of the control of each segment at this time are as shown in FIG. 7.

The user can confirm whether or not the camera is working smoothly by checking such indication on the finder. When the camera indicates information against the user's intention, it is considered that the detection of the main subject is also wrong. The camera may be configured to repeat its distance-measuring operation freshly in such a case in response to the operation of the focus lock as in FIG. 19A. In this case, the user is requested to operate manually a focus lock switch 202 provided as shown in FIG. 23A. Moreover, in order to associate between the distance-measuring points and the finder screen, the CPU conducts association operation based on measurement results of the distance-measuring and the angle of view at the time of photographing and the result is made to have influence on an LCD display control part.

Moreover, the present invention is also applicable to such a single-lens reflex camera as in the following.

Figure 26:
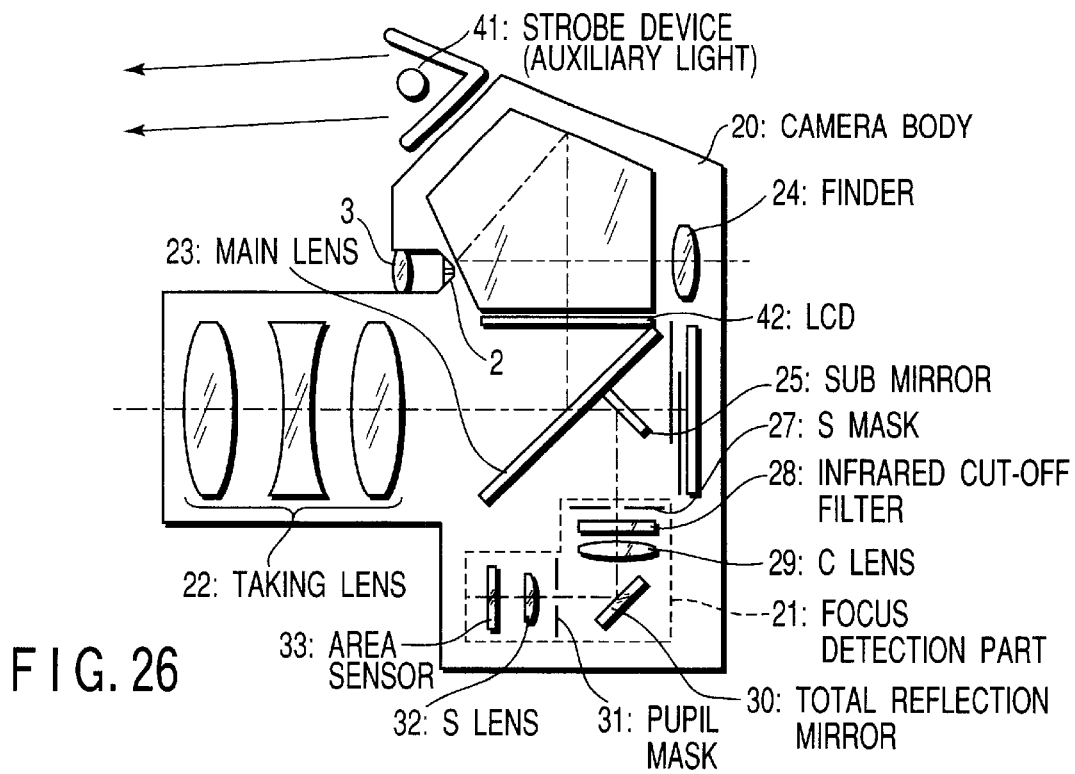
FIG. 26 is a sectional view showing a construction of a single-lens reflex camera to which the focus detection device according to the present invention has been applied.

FIG. 26 is a sectional view showing a construction of the single-lens reflex camera to which the focus detection device according to the present invention. A beam of light passing through a taking lens 22 from the subject is partly reflected and partly transmitted by a main mirror 23. A beam reflected by this main mirror 23 is directed to a finder 24 and a beam transmitted by the main mirror 23 is reflected by a sub mirror 25 and directed to a focus detection part 21 provided in the lower part of a camera body 20. A numeral 41 denotes a strobe device whose light also serves as auxiliary light in detecting the focus.

A numeral 42 is an LCD, which displays a position of in-focus in the photographing image plane in such a way that the user can confirm the position on the finder. A CPU 40 (FIG. 27) controls the display.

This focal detection part 21 is for detecting the focus by the differential phase detection method and is composed of a field mask (S mask) 27 for narrowing the beam having passed through the taking lens 22, an infrared cut-off filter 28, a condenser lens (C lens) 29 for collecting the beam, a total reflection mirror 30 for reflecting the beam totally, a pupil mask 31 for limiting the beam, an area sensor 33 of a main system, and re-imaging lenses (S lenses) 32 for forming images again on the area sensor 33 from the beam.

Figure 27:
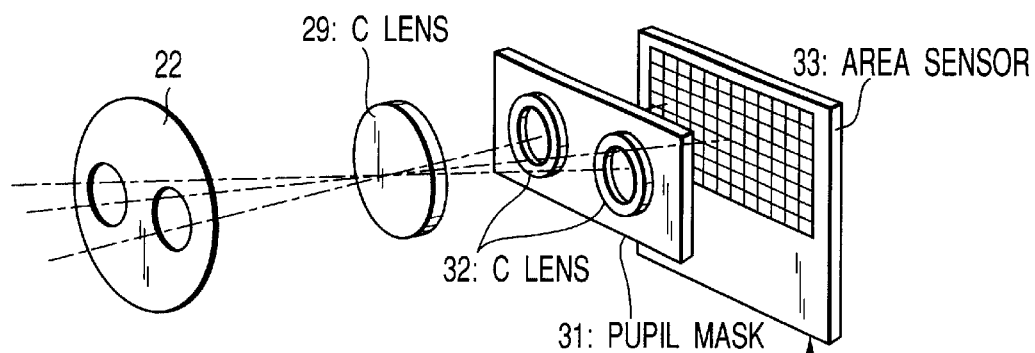
FIG. 27 is a perspective view of a focus detection part 21 shown in FIG. 26.

FIG. 27 is a perspective view of the above-mentioned focusing detection part 21, showing that the S lenses 32 for transmitting the beam from the subject are provided at the rear of the pupil mask 31. The CPU 40 controls operations of the area sensor 33 and the strobe device 41. The CPU 40 starts the operation of integration of the area sensor 33, and if necessary, makes the strobe device 41 emit light, and obtain sensor data at the time of emission of light or at the time of non-emission of light. The CPU 40 reads sensor data from the area sensor 33 and conducts operations of main subject detection, focusing detection, etc.

Figure 28:
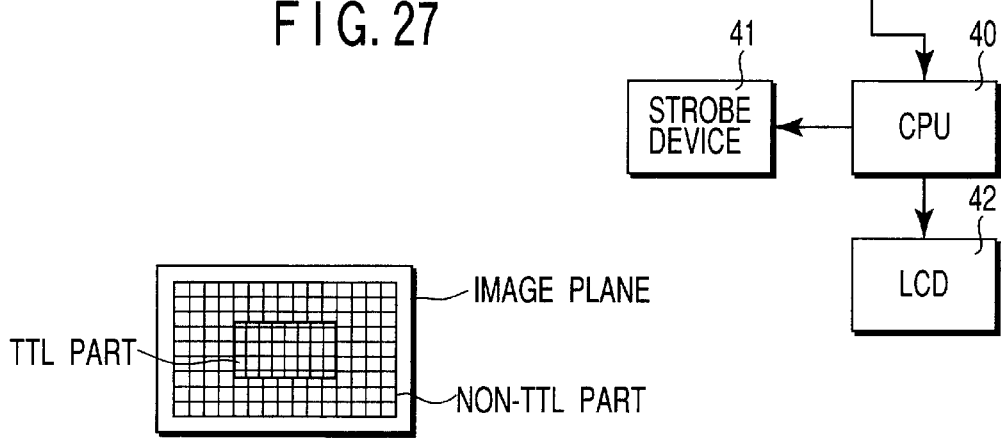
FIG. 28 is a view for explaining an embodiment where a non-TTL distance-measuring apparatus is provided in an auxiliary manner to compensate the image signal.
Figure 29:
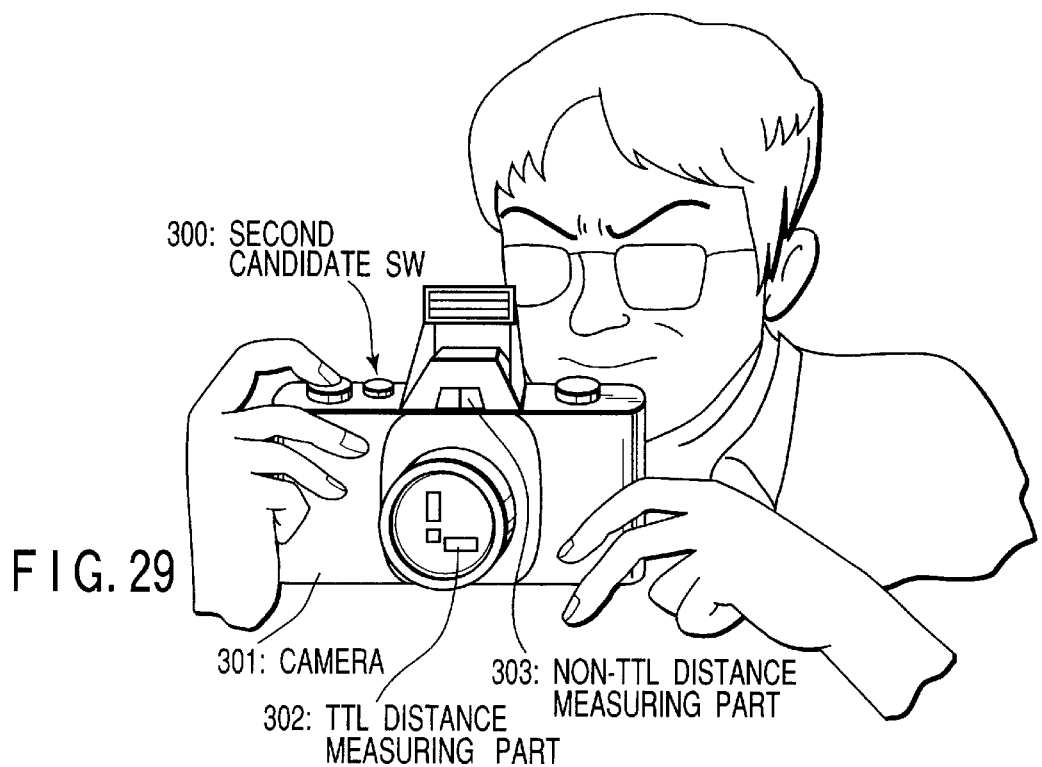
FIG. 29 is an external view of the camera equipped with the non-TTL distance-measuring apparatus.

However, in such distance-measuring apparatus of the so-called TTL (Through The Lens) type, it is often the case that the distance-measuring over the whole image plane cannot be performed due to restriction of the sub mirror, distance-measuring optics, etc. To cope with this, in this embodiment, it may be thought that a so-called non-TTL distance-measuring apparatus (comprising an area sensor 2 and a light-receiving lens 3 of a sub system) that was explained in FIGS. 5A to 5C is provided in an auxiliary manner so that image signals of a deficiency part are compensated as in FIG. 28. In such a construction, first, non-TTL AF is used to select the position of the main subject and then the TTL AF is carried out on the central part of the image plane. FIG. 29 is an external view of the camera used in this embodiment. In the figure, a numeral 300 denotes a second candidate switch, a numeral 301 is the camera, a numeral 302 a TTL distance-measuring part, and a numeral 303 a non-TTL distance-measuring part.

Figure 30A:
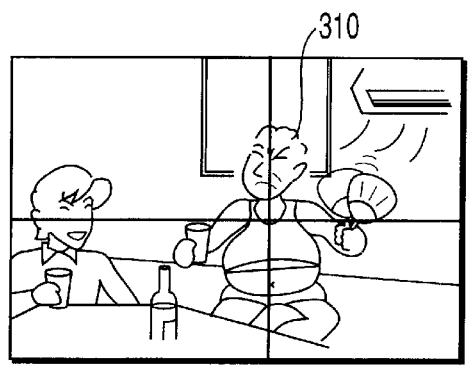
FIGS. 30A to 30C are views for explaining an embodiment where a second candidate for focusing is judged by the CPU in conformity to the user's manipulation of a second candidate switch provided on the camera.
Figure 30B:
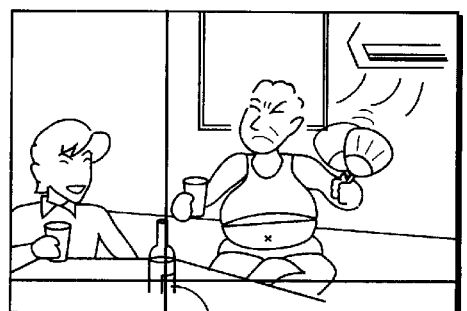
Figure 30C:
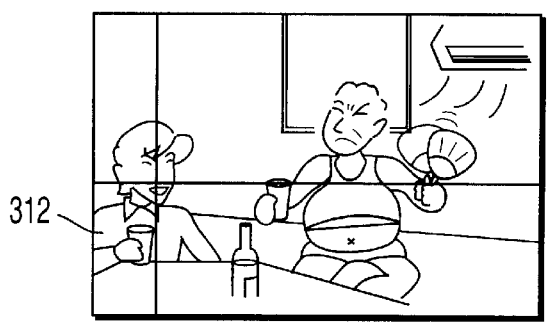

There is a case where, even with the camera that the present invention is applied to, the CPU thereof cannot judge which is the main subject in such a scene as in FIGS. 30A to 30C. Basically as in FIG. 30A, if a judgment pattern that prioritizes a person 310 existing in the center is adopted, it will be OK with a considerable probability. However, in some conditions, erroneous focusing to a liquor bottle 311 may be carried out as in FIG. 30B. Or there may be a case where the photographer actually wishes to focus a person 312 sitting in a separate seat as in FIG. 30C. In this case, if the CPU is configured to judge a second candidate of focusing in conformity to the user's manipulation of the second candidate switch 300 provided on the camera and the second candidate so judged is indicated on the LCD in the finder to enable the user to recognize it, most of the user's discontent can be eliminated.

Moreover, as in this case, if this contrivance is applied to the single-lens reflex camera, the user can judge whether or not a particular subject is in focus, and hence this facilitates the confirmation of a focusing position much easily.

Even in such an example, switching judgment of the integration area that is a feature of the present invention is still an important technology.

That is, this is because, although controls of the emission time and the integration at the time of pre-emission for detecting the main subject are conducted for a relatively wider area, at the time of actual distance-measuring, a scheme where the integration judgment area is made to be narrow and only the main subject is intended to be detected in order not to photograph miscellaneous images other than the main subject as less as possible can realize high-accuracy distance-measuring.

According to the present invention, since the distance-measuring apparatus is configured to conduct an appropriate integration control at whichever position in the image plane the subject exists, the exact distance-measuring become possible and the camera capable of carrying out correct focusing can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distance-measuring apparatus for a camera comprising:
   (a) an area sensor for light-receiving a picture image in an image plane;
   (b) an integration circuit for integrating output signals of the area sensor;
   (c) an integration control circuit for controlling an operation of starting an integration of said integrating circuit and an operation of stopping the integration of said integrating circuit, based on output signals corresponding to a specific block of said area sensor;
   (d) a switching circuit for switching said specific block in accordance with a using state of the camera; and
   (e) a distance-measuring circuit for outputting signals dependent on a distance to a subject based on outputs output from a region of said area sensor larger than said specific block.

2. A distance-measuring apparatus for a camera according to claim 1, wherein said using state of the camera is an attitude of the camera.

3. A distance-measuring apparatus for a camera according to claim 1, wherein said using state of the camera is judged based on information of a luminance distribution in said image plane.

4. A distance-measuring apparatus for a camera according to claim 1, wherein said using state of the camera is judged based on a photographing mode selected by the photographer at the time of using the camera.

5. A distance-measuring apparatus for a camera comprising:
   (a) an area sensor in which a plurality of pixels are arranged two-dimensionally;
   (b) first integrating means for measuring a distribution of a subject image in an image plane, based on outputs of the area sensor;
   (c) determining means for determining a specific area in said area sensor with which an integration judgment is made at a time of performing distance measuring, in accordance with a measurement result of said distribution of a subject image by the first integrating means; and
   (d) second integrating means for conducting integration control of said area sensor in a region larger than said specific area, based on signals from said specific area determined by said determining means, in order to measure image signals at said time of performing the distance-measuring.

6. A distance-measuring apparatus for a camera according to claim 5, wherein said determining means determines said specific area in an area excluding areas that are judged to be in high luminance, based on a measurement result of said first integration means.

7. A method for performing distance-measuring using a camera which measures a distance to a subject based on outputs from an area sensor in which pixels are arranged two-dimensionally, comprising:
   (a) a first integration step of integrating image signals in an image plane to specify a main subject in the image plane;
   (b) a second integration step of integrating image signals of said main subject; and
   (c) an arithmetic step of calculating a distance to said main subject using a result of said second integration step;

wherein sets of the pixels to be used to make an integration judgment in said first integration step and in said second integration step have different configurations, respectively; and wherein a pixel region of the area sensor used in said second integration step is larger than a pixel region of the area sensor used in said first integration step.

8. A method for performing distance-measuring for a camera according to claim 7, wherein said first integration step includes an operation of making an emission means emit light.

9. A distance-measuring apparatus for obtaining a distance to a subject comprising:

(a) an area sensor;

(b) detecting means for detecting a subject image using outputs of the area sensor; and (c) switching means for setting integration judgment areas that are formed by selecting and combining a plurality of pixels in said area sensor and controlling said integration judgment areas, so as to take a plurality of configurations in order to control said subject image to be within a proper integration measure;

wherein signals dependent on the distance to the subject are output based on outputs output from a region of said area sensor larger than said integration judgment areas.

10. A distance-measuring apparatus for obtaining the distance to the subject according to claim 9, wherein said plurality of configurations are configurations formed by arranging said integration judgment areas one-dimensionally in said area sensor.

11. A distance-measuring apparatus for obtaining the distance to the subject according to claim 9, wherein said plurality of configurations are a plurality of configurations formed by arranging one of said integration judgment areas two-dimensionally in said area sensor.

12. A distance-measuring apparatus for obtaining the distance to the subject according to claim 9, wherein said plurality of configurations are configurations formed by arranging a plurality of the integration judgment areas two-dimensionally in said area sensor.

13. A distance-measuring apparatus for obtaining a distance to a subject comprising:

(a) an area sensor;

(b) detecting means for detecting a subject image using outputs of the area sensor; and (c) switching means for setting integration judgment areas that are formed by selecting and combining a plurality of pixels in said area sensor and controlling said integration judgment areas, so as to take a plurality of configurations in order to control said subject image to be within a proper integration measure;

wherein said plurality of configurations are a plurality of configurations formed by arranging one of said integration judgment areas two-dimensionally in said area sensor;

wherein said two-dimensional arrangement is a shape consisting of two areas each of which exists along one of two sides of a triangle; and wherein signals dependent on the distance to the subject are output based on outputs output from a region of said area sensor larger than said integration judgment areas.

14. A distance-measuring apparatus for a camera comprising:

(a) an area sensor capable of using a plurality of areas in a two dimensional light-receiving area as monitor areas by which integration control is conducted;

(b) emission means for projecting light toward a subject;

(c) monitor selection means for making said emission means operate, for receiving reflected light from said subject with the area sensor, and for selecting one of said monitor areas, based on outputs thereof; and (d) controlling means for conducting integration control of output signals of said area sensor at a time of performing distance-measuring, based on an output of the monitor area selected by said monitor selection means;

wherein signals dependent on a distance to a subject are output based on outputs output from a region of said area sensor larger than said monitor area.

15. A distance-measuring apparatus for a camera comprising:

(a) a plurality of area sensors of a main system and a sub system;

(b) setting means for setting a monitor area to be used for controlling an integral time of said area sensor of the main system, based on both picture image information of said area sensor of the sub system and photographing information entered to the camera according to a photographing intention;

(c) integration controlling means for controlling the integral time of said area sensor of the main system; and (d) arithmetic means for obtaining a distance to a subject, based on outputs from a region of said area sensor of the main system larger than said monitor area.

16. A camera comprising:

(a) an area sensor that comprises a plurality of pixels and that light-receives an optical image in a photographing image plane;

(b) a selection circuit for determining a specific area in said area sensor; and (c) an integration control circuit for controlling a time to integrate output signals of said area sensor, based on pixel outputs of said specific area selected by the selection circuit;

wherein signals dependent on a distance to a subject are output based on outputs output from a region of said area sensor larger than said specific area.

17. A camera according to claim 16, wherein said specific area is selected among a plurality of areas in said area sensor that have been determined previously.

18. A camera according to claim 16, wherein said selection circuit determines said specific area in accordance with luminance variations in the X direction and in the Y direction perpendicular to the X direction.

19. A camera according to claim 16, wherein the camera further comprises a selection switch for enabling a photographer to select a desired photographing mode among a plurality of photographing mode programs that have been built into the camera previously, and said selection circuit determines said specific area in said area sensor based on an output of the selection switch.

20. A camera according to claim 16, wherein the camera further comprises a detection circuit for detecting a main subject in the photographing image plane, and said selection circuit determines said specific area in said area sensor based on outputs of said detection circuit.

21. A camera according to claim 16, wherein the camera further comprises an emission circuit for projecting light, and said selection circuit determines said specific area based on outputs from said area sensor at a time when the emission circuit is working.

22. A camera according to claim 16, wherein the camera further comprises a judgment circuit for judging a luminance distribution condition of an optical image in said photographing image plane based on outputs of said area sensor and said selection circuit determines the specific area in said area sensor based on an output of said judgment circuit.

23. A camera according to claim 22, wherein said judgment circuit adds outputs from sensors on lines in a vertical direction and in a horizontal direction and judges said luminance distribution conditions based on the addition results.

24. A camera according to claim 22, wherein said selection circuit determines said specific area in an area defined to exclude an area that is judged to be in high brightness by said judgment circuit.

25. A camera comprising:
(a) an area sensor that comprises a plurality of pixels and that light-receives an optical image in a photographing image plane;
(b) a selection circuit for determining a specific area in said area sensor; and
(c) an integration control circuit for controlling a time to integrate output signals of the area sensor, based on pixel outputs of said specific area selected by the selection circuit;
wherein the camera further comprises an attitude detection sensor for detecting an attitude of the camera, and said selection circuit determines the specific area in said area sensor based on an output of said attitude detection sensor; and
wherein signals dependent on a distance to a subject are output based on outputs output from a region of said area sensor larger than said specific block.

26. A camera according to claim 25, wherein said attitude detection sensor is a sensor for detecting whether or not the photographer holds the camera upward and when said attitude detection sensor detects upward facing of the camera, said selection circuit determines an oblong area lying horizontally in a lower part of the image plane to be said specific area.

27. A camera according to claim 25, wherein said selection circuit determines a plurality of said specific areas existing along right and left sides of a triangle both of which define a triangle spreading downward in said photographing image plane.

28. A camera comprising:
(a) an area sensor that comprises a plurality of pixels and that light-receives an optical image in a photographing image plane;
(b) a selection circuit for determining a specific area in said area sensor; and
(c) an integration control circuit for controlling a time to integrate output signals of the area sensor, based on pixel outputs of said specific area selected by the selection circuit;
wherein the camera further comprises an attitude detection sensor for detecting an attitude of the camera;
wherein said selection circuit determines an oblong area lying horizontally in said photographing image plane to be said specific area regardless of the attitude of the camera; and
wherein signals dependent on a distance to a subject are output based on outputs output from a region of said area sensor larger than said specific block.

29. A camera according to claim 28, wherein said attitude sensor is a sensor for detecting whether a photographer holds the camera lengthwise or widthwise and said selection circuit determines the oblong area lying horizontally in said photographing image plane to be said specific area regardless of a direction in which the photographer holds the camera.

30. A camera according to claim 28, wherein the camera further comprises a zoomed position detection part for detecting a focal length of a zooming taking lens, and said selection circuit determines said specific area based on an output of the zoomed position detection part.

* * * * *